(12) United States Patent
Okada

(10) Patent No.: US 7,018,106 B2
(45) Date of Patent: Mar. 28, 2006

(54) VEHICLE MOUNTED BEARING ASSEMBLY

(75) Inventor: Koichi Okada, Iwata (JP)

(73) Assignee: NTN Corporation, Osaka (JP)

( * ) Notice: Subject to any disclaimer, the term of this patent is extended or adjusted under 35 U.S.C. 154(b) by 73 days.

(21) Appl. No.: 10/317,114

(22) Filed: Dec. 12, 2002

(65) Prior Publication Data

US 2003/0110860 A1   Jun. 19, 2003

(30) Foreign Application Priority Data

Dec. 14, 2001 (JP) ............................. 2001-381229
Dec. 14, 2001 (JP) ............................. 2001-381230

(51) Int. Cl.
*F16C 19/08* (2006.01)

(52) U.S. Cl. .................................... 384/448

(58) Field of Classification Search ................ 384/448, 384/446, 544; 324/174, 173
See application file for complete search history.

(56) References Cited

U.S. PATENT DOCUMENTS

| | | |
|---|---|---|
| 5,845,230 A | 12/1998 | Lamberson |
| 6,161,962 A | 12/2000 | French et al. |
| 6,695,483 B1 * | 2/2004 | Sakatani et al. ............ 384/448 |
| 2003/0091253 A1 * | 5/2003 | Morita et al. ............... 384/448 |

FOREIGN PATENT DOCUMENTS

WO   WO 97/17599   5/1997

OTHER PUBLICATIONS

Patent Abstracts of Japan/ 2001-151090/ Jun. 5, 2001.

* cited by examiner

*Primary Examiner*—Lenard A. Footland

(57) ABSTRACT

To enhance a detecting capability for monitoring a bearing assembly and also to minimize complication of the structure resulting from increase in functionality, a vehicle mounted bearing assembly 51 includes inner and outer members 2 and 1 with rows of rolling elements 3 operatively interposed between the inner and outer members 2 and 1, and a rotation detecting sensor 4. A sensor output from the rotation detecting sensor 4 is digitalized by a digitalizing unit 101 and is subsequently transmitted wireless by a transmitting unit 105. One or both of status detecting sensors 52, 53 for detecting different statuses of the bearing assembly 51 other than rotation such as temperature and vibration occurring in the bearing assembly 51 may be additionally employed. A signal coordinating unit 104 may also be used for coordinating the respective sensor outputs from the rotation detecting sensor and the status detecting sensors to enable those sensor outputs to be transmitted wireless by the transmitting unit 105.

10 Claims, 17 Drawing Sheets

VEHICLE MOUNTED BEARING ASSEMBLY

BACKGROUND OF THE INVENTION

1. Field of the Invention

The present invention generally relates to a vehicle mounted bearing assembly such as a wheel support bearing assembly for supporting a wheel of an automotive vehicle and, more particularly, to the vehicle mounted bearing assembly of a type that is equipped with a rotation detecting sensor used as a component part of an automobile anti-lock control system.

2. Description of the Prior Art

In an automobile anti-lock braking system or the like, the necessity has long been recognized to detect the number of revolutions or rotational speed of one or more vehicle wheels so that the behavior of the vehicle wheels tending to skid can be controlled. A rotation detecting sensor employed in an automotive vehicle for this purpose is generally incorporated in a wheel support bearing assembly that is used to support a vehicle wheel. A detected rotation signal outputted from the rotation detecting sensor that is indicative of the rotational speed of the wheel is generally supplied from the wheel support bearing assembly to an external control box installed at a remote location outside the wheel support bearing assembly but within a vehicle body structure by means of a signal transmitting cable.

As is well known to those skilled in the art, electric wiring including not only the signal transmitting cable but also electric power supply lines and extending from the rotation detecting sensor within the wheel support bearing assembly to the external control box is generally routed via and, hence, exposed to the outside space between the rotation detecting sensor and the external control box. Accordingly, it has often been observed that some of the electric lines forming the electric wiring, including those of the signal transmitting cable are damaged or broken upon collision with gravel stones or rocks or under the influence of freeze-up of a tire house. In order to alleviate those problems, the assignee of the present invention has suggested in the Japanese Laid-open Patent Publication No. 2001-151090 a wireless transmission system by which a detected rotation signal outputted from a rotation detecting sensor can be transmitted wireless to an external control box provided within a vehicle structure.

According to the above mentioned publication, it has been found involving a problem in that since the detected rotation signal outputted form the rotation detecting sensor is in the form of an analog signal, the detected rotation signal is susceptible to external noises. The existing anti-lock braking system now in use appears to pose no problem and works satisfactorily even though the detected rotation signal in the form of an analog signal is transmitted wireless.

However, the site where the wheel support bearing assembly is installed is under a severe condition susceptible to change in temperature and full of muddy water and/or dusts and, moreover, the automotive vehicle has a number of sources of external noises that adversely affect the wireless transmission of signals. Thus, considering that the rotation detecting sensor is placed under such a severe condition and in a manner susceptible to influences brought about by the external noises, it appears that the existing anti-slid braking system lacks a sufficient reliability particularly where a highly trustworthy anti-lock control is desired.

While the conventional sensor-equipped wheel support bearing assembly is designed to use the rotation detecting sensor for the sole purpose of detecting the rotational speed of the wheel, the inventors of the present invention have now devised to make the best use of the detected rotation signal from the rotation detecting sensor and a transmission unit for transmitting the rotation signal wireless for a different purpose of monitoring the vehicle mounted bearing assembly such as a wheel support bearing assembly so that the presence or absence of an abnormality in functionality of the vehicle mounted bearing assembly can be diagnosed.

SUMMARY OF THE INVENTION

In view of the foregoing, the present invention has for its primary object to provide a vehicle mounted bearing assembly of a kind in which the reliability of transmitting wireless a detected rotation signal indicative of the rotational speed of the wheel is increased.

Another important object of the present invention is to enhance the detecting capability to enable the vehicle mounted bearing assembly itself to be monitored without the vehicle mounted bearing assembly being complicated.

In order to accomplish these objects, the present invention in one aspect thereof provides a vehicle mounted bearing assembly used to rotatably support a vehicle body structure and including an outer member having an inner peripheral surface formed with at least two axially spaced apart raceways, an inner member positioned inside the outer member and having raceways defined therein in cooperative relation with and in alignment with the raceways in the outer member; and rows of rolling elements positioned within an annular space, defined between the outer and inner members, and accommodated in part within the raceways in the outer member and in part within the raceways in the inner member. The vehicle mounted bearing assembly also includes a rotation detecting sensor for detecting a relative rotation between the outer and inner members, at least one status detecting sensor for detecting a status of the bearing assembly other than the relative rotation that is detected by the rotation detecting sensor, and a transmitting device for transmitting wireless respective sensor outputs generated by the rotation detecting sensor and the status detecting sensor.

Since as described above the status detecting sensor is employed in addition to the rotation detecting sensor and respective sensor outputs from the rotation detecting sensor and the status detecting sensor are transmitted wireless by the transmitting device, not only can the number of revolutions of the wheel be detected, but the statuses of the vehicle mounted bearing assembly can also be detected with a detecting capability increased for monitoring the vehicle mounted bearing assembly itself. Accordingly, complication of the structure which would otherwise result from the increase in functionality can advantageously be suppressed. Also, the sensor output generated by the status detecting sensor and subsequently transmitted by the transmitting device can be utilized to diagnose the status of the bearing assembly so that a preventive action can be taken to any possible trouble occurring in the bearing assembly and, also, servicing thereof can be facilitated.

In a preferred embodiment of the present invention, where the vehicle mounted bearing assembly is used as a wheel support bearing assembly for rotatably supporting a vehicle wheel, the vehicle mounted bearing assembly may include the outer member having the inner peripheral surface formed with at least two axially spaced apart raceways, the inner member positioned inside the outer member and having raceways defined therein in cooperative relation with and in alignment with the raceways in the outer member, and rows of the rolling elements positioned within the annular space and accommodated in part within the raceways in the outer member and in part within the raceways in the inner member, and operable to rotatably support the vehicle wheel relative to the vehicle body structure.

In another preferred embodiment of the present invention, the vehicle mounted bearing assembly also includes a signal coordinating device for coordinating the respective sensor outputs from the rotation detecting sensor and the at least one status detecting sensor to enable those sensor outputs to be transmitted wireless by the transmitting device. The use of the signal coordinating device conveniently allows the single transmitting device to transmit both of the sensor outputs respectively from the rotation detecting sensor and the status detecting sensor. It is, however, to be noted that the signal coordinating device referred to above is operable to coordinate the sensor outputs respectively from the rotation detecting sensor and the status detecting sensor in a manner enabling them to be transmitted by the single transmitting device.

In a further preferred embodiment of the present invention, the vehicle mounted bearing assembly may also include a first digitalizing device for digitalizing the sensor output from the rotation detecting sensor and a second digitalizing device for digitalizing the sensor output from the at least one status detecting sensor. In combination with the use of the first and second digitalizing device, the vehicle mounted bearing assembly preferably includes the signal coordinating device for coordinating the respective sensor outputs from the rotation detecting sensor and the status detecting sensor, which have been digitalized by the first and second digitalizing device, respectively, to enable those sensor outputs to be transmitted wireless by the transmitting device.

Where the digitalizing device are employed, not only the sensor output from the rotation detecting sensor, but also the sensor output from the status detecting sensor can be digitalized prior to those sensor outputs being transmitted by the transmitting device and, therefore, not only can a highly reliable communication is possible, but a highly accurate diagnosis can also be achieved. Also, since the signal coordinating device is used in combination with the digitalizing device so that the respective sensor outputs from the rotation detecting sensor and the status detecting sensor can be coordinated with each other, the transmitting device for transmitting the sensor output of the rotation detecting sensor can also be used for concurrently transmitting the sensor output of the status detecting sensor, thereby suppressing any possible complication of the structure which would otherwise result from increase in detecting functionality. Considering that the sensor outputs are digitalized, it is quite easy for the signal coordinating device to coordinate those sensor outputs.

In a further preferred embodiment of the present invention, where the transmitting device is of a type capable of transmitting an analog signal, the signal coordinating device may be a signal superimposing device for superimposing the sensor outputs respectively from the rotation detecting sensor and the status detecting sensor, which are to be inputted to the transmitting device. Thus, where the sensor outputs are superimposed, a single signal containing a signal component representative of the sensor output of the rotation detecting sensor and a signal component representative of the sensor output of the status detecting sensor can be transmitted by the transmitting device, thereby simplifying the transmitting device.

Where the rotation detecting sensor is of a type capable of generating a train of pulses proportional to the number of revolutions of the vehicle wheel, the signal coordinating device used in the form of the signal superimposing device may be of a type capable of superimposing the sensor outputs by changing the pulse width of the train of the pulses with the sensor output of the status detecting sensor.

In a further preferred embodiment of the present invention, the status detecting sensor may be one or both of temperature and vibration detecting sensors. Since diagnosis to determine the service lifetime of the vehicle mounted bearing assembly and also to determine the presence or absence of a trouble occurring in the vehicle mounted bearing assembly can be made using data on the temperature of the vehicle mounted bearing assembly and vibrations occurring in the vehicle mounted bearing assembly, the use of the detecting sensors makes it possible to monitor the status of the vehicle mounted bearing assembly so that the vehicle mounted bearing assembly can be diagnosed based on the signals from the detecting sensors to enable a preventive action to be taken to a possible trouble occurring in the vehicle mounted bearing assembly and to facilitate the servicing and maintenance of the vehicle mounted bearing assembly.

Also, the signal coordinating device may preferably be a data switching device for sequentially switching one of output signals from the first and second digitalizing device such that the signal coordinating device receives the output signals one at a time. In such case, the sensor output outputted from the rotation detecting sensor and subsequently digitalized and the sensor output outputted from the status detecting sensor and subsequently digitalized can be, for example, alternately transmitted in sequence.

Preferably, the first digitalizing device associated with the sensor output outputted from the rotation detecting sensor may generate a signal representative of bits of the sensor output of the rotation detecting sensor added with at least one redundant bit. Addition of the redundant bit enables an error recognition and correction to be accomplished in the event that the sensor output is partly degraded, thereby increasing a reliability.

Alternatively, the first digitalizing device associated with the sensor output outputted from the rotation detecting sensor may be of a type operable to convert or encode the sensor output of the rotation detecting sensor, which has been digitalized thereby, into a digital data of a predetermined data format and then to output the digital data. Data conversion or encoding of the digitalized sensor output initially outputted from the rotation detecting sensor can enhance a security.

The rotation detecting sensor that can be employed in the vehicle mounted bearing assembly of the present invention may be a device for generating a train of pulses, in which case the sensor output of the rotation detecting sensor which has been digitalized by the first digitalizing device is a cycle data of the train of the pulses. While a pulse generating device is generally used for the rotation detecting sensor, if the cycle data of the pulses in such case is digitalized, digitalization can easily be accomplished and, therefore, a highly accurate signal as the sensor output indicative of the number of revolutions of the vehicle wheel can be obtained.

The transmitting device may preferably be of a type capable of implementing spread spectrum communication. For the spread spectrum communication system, a frequency hopping system or a direct spread spectrum system, for example, can be employed.

With the spread spectrum communication system, it is possible to accomplish communication robust against disturbances and/or interference. By way of example, interfering waves and/or noises within the same frequency range can be rejected satisfactorily and the transmission is hardly affected by undesirable effects of wave propagation such as fading. Also, a highly secure communication is possible with the spread spectrum communication system. Where the spread spectrum communication system is employed, the sensor output of the rotation detecting sensor is preferably in the form of a cycle data of the pulses referred to hereinabove.

In any event, the rotation detecting sensor employed in the practice of the present invention may be an electric power generator. Where the rotation detecting sensor concurrently serves as the electric power generator, no power supply line is needed to supply an electric power to the rotation detecting sensor. Supply of an electric power to the transmitting device and the status detecting sensor can be made from the rotation detecting sensor as the latter concurrently serves as the electric power generator. In this way, all conducting lines otherwise required to connect between the vehicle mounted bearing assembly and the vehicle body structure can be eliminated.

In a still further preferred embodiment of the present invention, the transmitting device may be of a type utilizable as a mobile terminal connectable to a mobile communication network. Where the transmitting device serves as the mobile terminal through which the sensor outputs can be transmitted to the mobile communication network, the vehicle mounted bearing assembly can be monitored at a remote site such as a business organization where the vehicle mounting bearing assembly can receive a servicing and/or repair. In addition, the use of the transmitting device serving as the mobile terminal connectable to the mobile communication network can make it possible that all of the functions performed to transmit the respective sensor outputs of the rotation and status detecting sensors to the mobile communication network can be accomplished in and by the vehicle mounted bearing assembly and, accordingly, required jobs of, for example, wiring and setup after the vehicle mounted bearing assembly has been incorporated in the automotive vehicle can advantageously be simplified.

The present invention according to another aspect thereof also provides a vehicle mounted bearing assembly including the outer member having the inner peripheral surface formed with at least two axially spaced apart raceways, the inner member positioned inside the outer member and having raceways defined therein in cooperative relation with and in alignment with the raceways in the outer member, rows of the rolling elements positioned within the annular space, delimited between the inner and outer members, and accommodated in part within the raceways in the outer member and in part within the raceways in the inner member, the rotation detecting sensor for detecting a relative rotation between the outer and inner members, the digitalizing device for digitalizing a sensor output from the rotation detecting sensor, and the transmitting device for transmitting wireless the sensor output which has been generated by the rotation detecting sensor and subsequently digitalized by the digitalizing device.

According to this aspect of the present invention, since the sensor output from the rotation detecting sensor can be transmitted after having been digitalized, as compared with transmission of an analog signal a highly reliable communication is possible. By way of example, by utilizing a suitable process of, for example, adding a redundant bit as will be described later, it is easy to further increase the reliability.

Thus, since a highly reliable transmission of the sensor output indicative of the number of revolutions of the vehicle wheel can be achieved, the reliability of control of the automotive vehicle by means of an anti-lock braking system or the like can be increased particularly where the vehicle mounted bearing assembly is a wheel support bearing assembly used to rotatably support the vehicle wheel. Considering that the transmitting device performs a wireless transmission, any connecting cable otherwise employed will not be exposed to the outside and there is no possibility of the otherwise employed connecting cable being damaged or broken. In addition, the use of the wireless transmission eliminates the need to perform a complicated and time-consuming wiring job. Those advantages afforded by the present invention lead to reduction in weight and cost of automotive vehicles. This transmitting device may be of a type capable of performing a wireless transmission by means of any one of radio waves, magnetic coupling, infrared beams and ultrasonic waves as long as signals are transmitted in the air.

In one preferred embodiment according to the second mentioned aspect of the present invention, the rotation detecting sensor may be an electric power generator. Where the rotation detecting sensor concurrently serves as the electric power generator, no power supply line is needed to supply an electric power to the rotation detecting sensor. Supply of an electric power to the transmitting device and any status detecting sensor if employed can be made from the rotation detecting sensor as the latter concurrently serves as the electric power generator. In this way, all conducting lines otherwise required to connect between the wheel support bearing assembly and the vehicle body structure can be eliminated.

In another preferred embodiment according to the second mentioned aspect of the present invention, the transmitting device may be of a type utilizable as a mobile terminal connectable to a mobile communication network. Where the transmitting device serves as the mobile terminal through which the sensor outputs can be transmitted to the mobile communication network, the vehicle mounted bearing assembly can be monitored at a remote site such as a business organization where the vehicle mounting bearing assembly can receive a servicing and/or repair. In addition, the use of the transmitting device serving as the mobile terminal connectable to the mobile communication network can make it possible that all of the functions performed to transmit the respective sensor outputs of the rotation and status detecting sensors to the mobile communication network can be accomplished in and by the vehicle mounted bearing assembly and, accordingly, required jobs of, for example, wiring and setup after the vehicle mounted bearing assembly has been incorporated in the automotive vehicle can advantageously be simplified.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
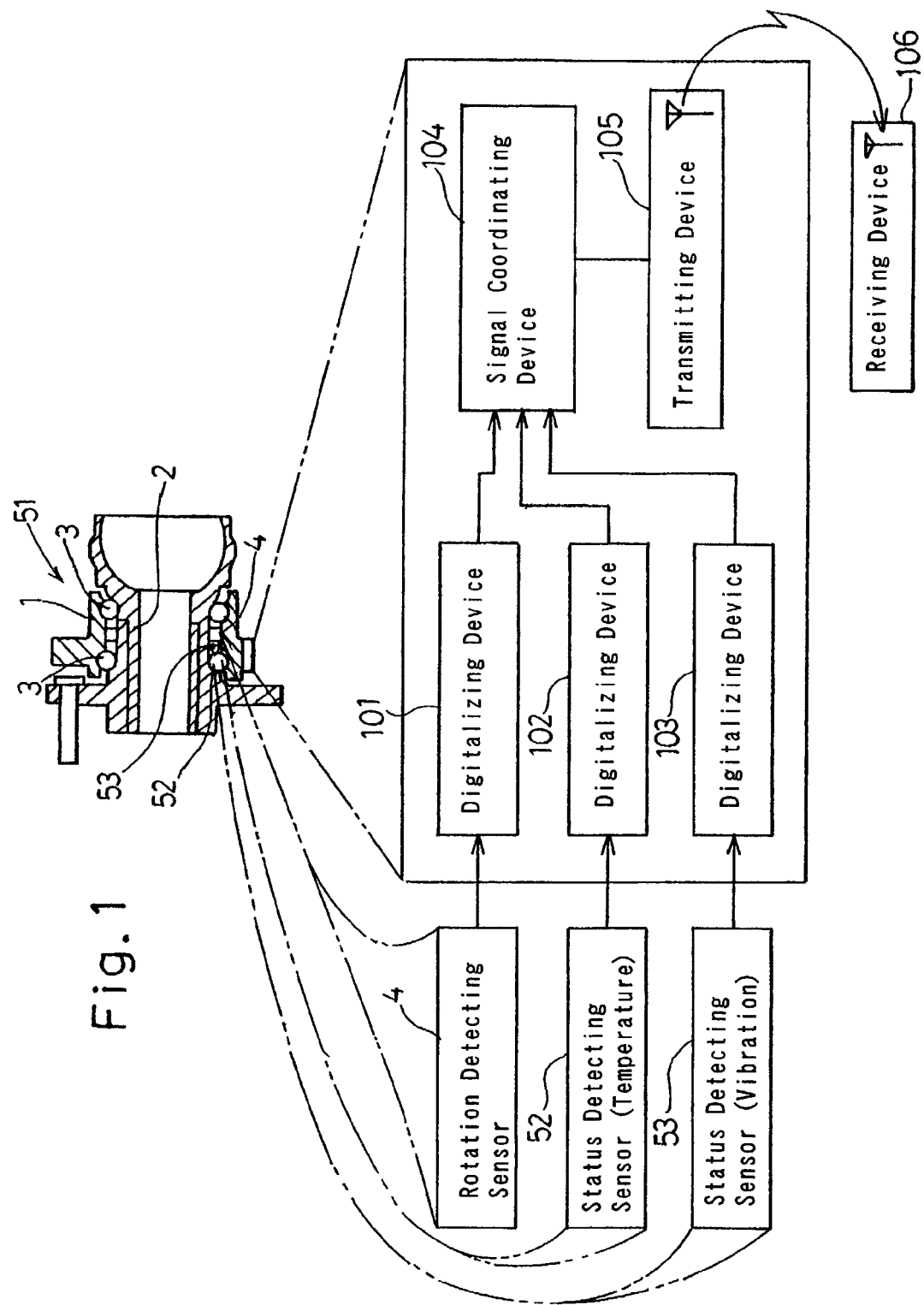
FIG. 1 is a block diagram showing a conceptual construction of a vehicle mounted bearing assembly according to a first preferred embodiment of the present invention.
Figure 2:
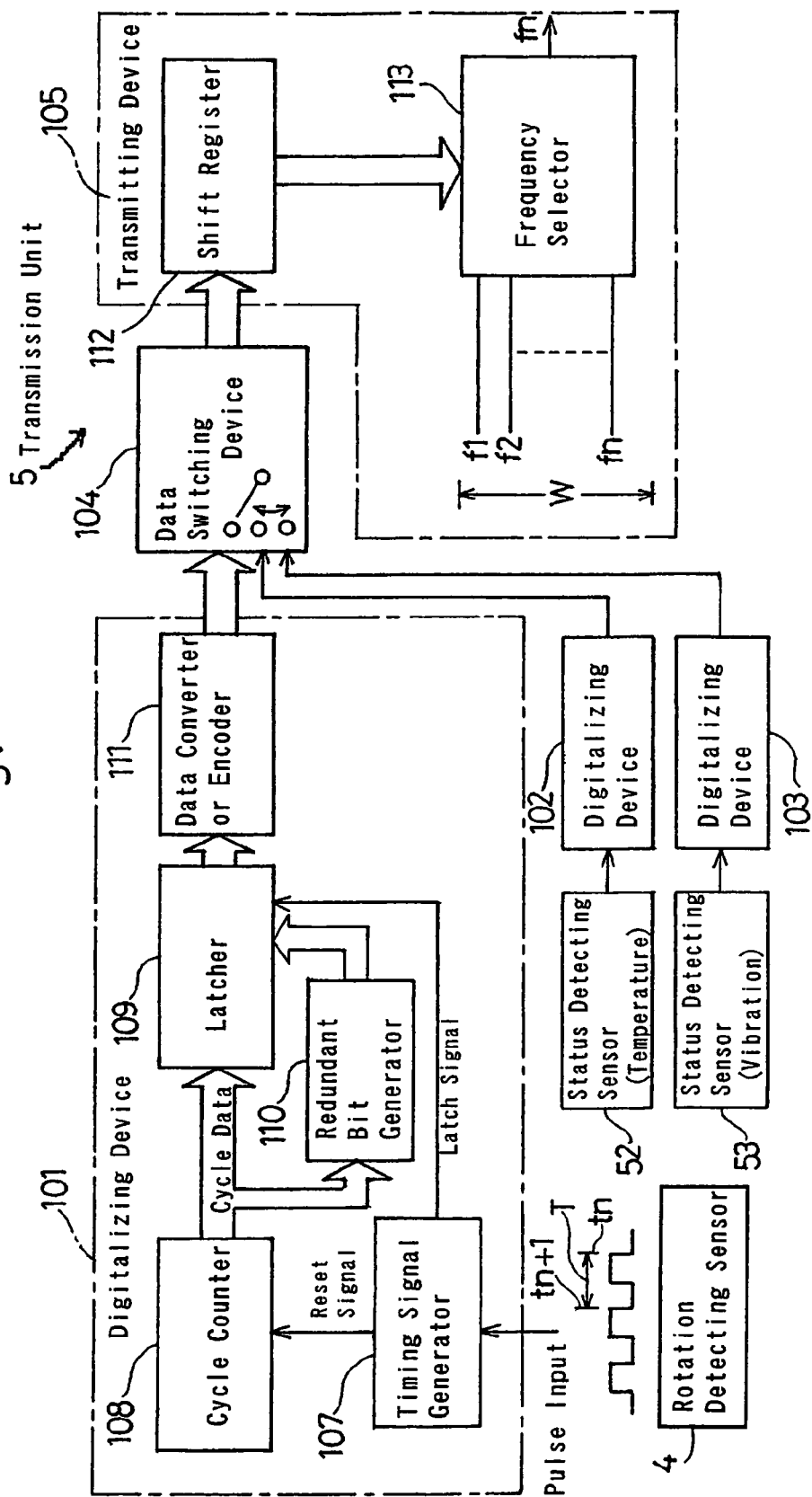
FIG. 2 is a block circuit diagram showing a transmission unit employed in the vehicle mounted bearing assembly shown in FIG. 1.
Figure 3:
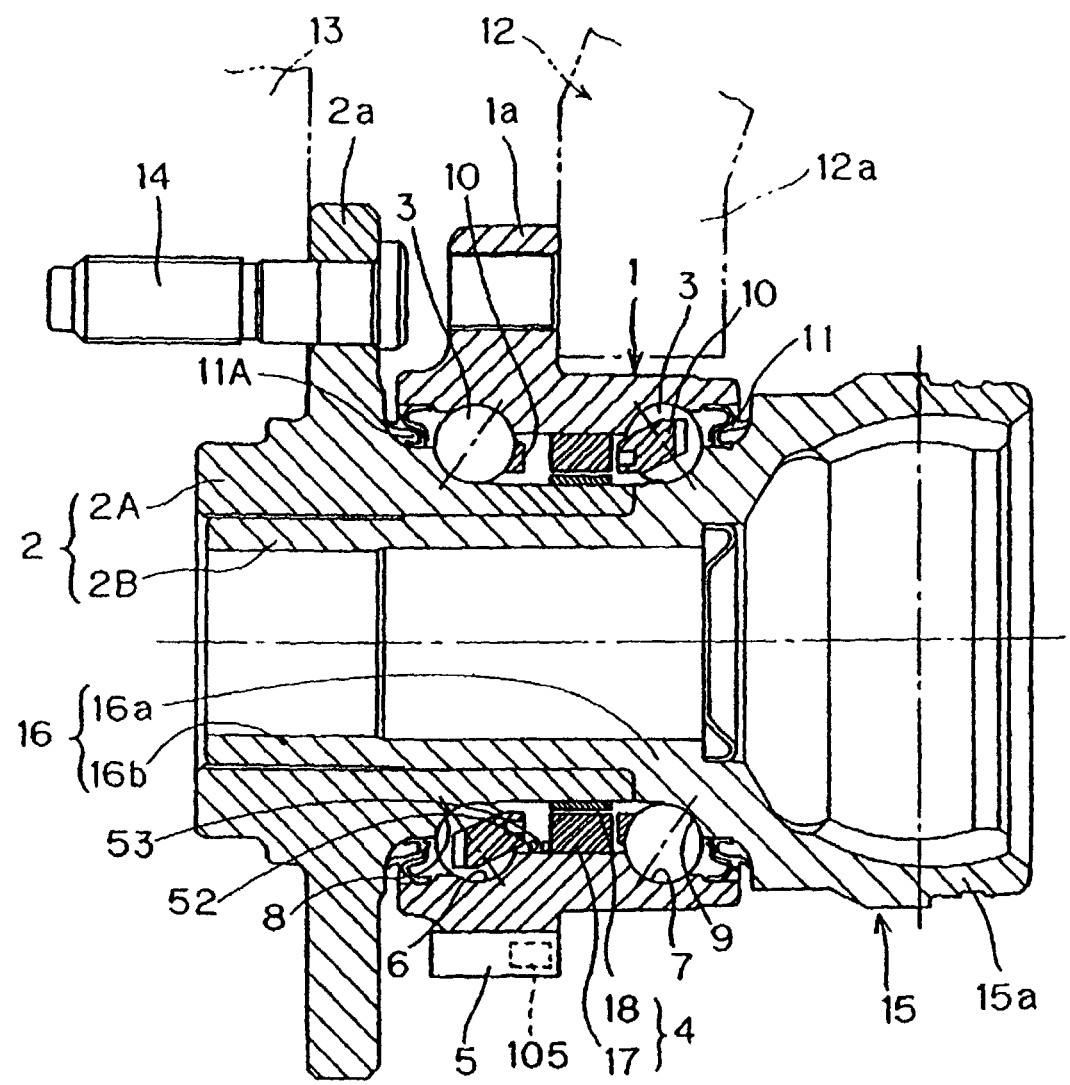
FIG. 3 is a longitudinal sectional view of the vehicle mounted bearing assembly of FIG. 1, showing the details thereof.
Figure 4:
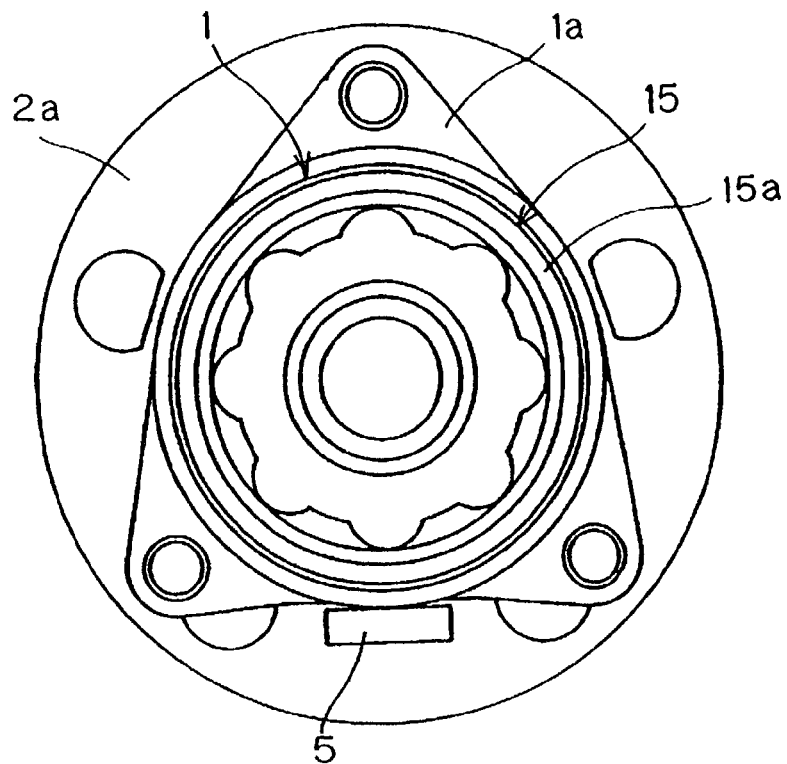
FIG. 4 is an end view, on an enlarged scale, showing the vehicle mounted bearing assembly as viewed from a constant velocity universal joint employed therein.

With reference to FIGS. 1 and 2, a vehicle mounted bearing assembly according to a first preferred embodiment of the present invention will be described. The vehicle mounted bearing assembly 51 shown therein is applied to a wheel support bearing assembly used to rotatably support a vehicle wheel relative to a vehicle body structure and includes an outer member 1 having an inner peripheral surface formed with a plurality of, for example, two raceways, an inner member 2 having raceways defined therein so as to align with and confront the raceways in the outer member 1 and rows of rolling elements 3 rollingly accommodated in part within the raceways in the outer member 1 and in part within the raceways in the inner member 2.

The vehicle mounted bearing assembly 51 also includes a sensor 4 for detecting a relative rotation between the outer member 1 and the inner member 2, a digitalizing device 101 for digitalizing a detected rotation signal outputted from the rotation detecting sensor 4, and a transmitting device 105 for transmitting wireless the detected rotation signal which has been digitalized. The rotation detecting sensor 4 is of a type capable of generating a train of pulses of a frequency proportional to the number of revolutions of the inner member 2 relative to the outer member 1 and is defined by, for example, an electric power generator as will be described in detail later.

The vehicle mounted bearing assembly 51 furthermore includes first and second status detecting sensors 52 and 53 for detecting different statuses other than the number of revolutions of the inner member 2 relative to the outer member 1, first and second digitalizing devices 102 and 103 for digitalizing detection signals outputted from the first and second status detecting sensors 52 and 53, respectively, and a signal coordinating device 104 for coordinating the output signals from the detecting sensors 4, 52 and 53, which have been digitalized by the associated digitalizing device 101 to 103, to enable those digitalized detection signals to be transmitted wireless by the transmitting device 105. In the illustrated embodiment, the first status detecting sensor 52 is in the form of a temperature detecting sensor for detecting the temperature of the vehicle mounted bearing assembly 51 while the second status detecting sensor 53 is in the form of a vibration detecting sensor for detecting a vibration of the vehicle mounted bearing assembly 51. Respective signal output side portions of those detecting sensors 52, 53 and 4 are fitted to one of the outer and inner members 1 and 2 of the vehicle mounted bearing assembly 51 that serves as a stationary member. In the illustrated embodiment, the outer member 1 is a stationary member and, hence, the respective signal output side portions of those detecting sensors 52, 53 and 4 are fixed to the outer member 1.

A signal receiving device 106 cooperable with the transmitting device 105 is disposed at an appropriate location, for example, within a tire housing in an automobile body structure that is equipped with the vehicle mounted bearing assembly 51 of the present invention.

The digitalizing device 101 to 103 and the signal coordinating device 104 altogether constitute a single transmission unit 5 that is fitted to one of the outer and inner members 1 and 2 of the vehicle mounted bearing assembly 51 that serves as the stationary member, that is, the outer member 1 in the illustrated embodiment. The transmission unit 5 can be handled as a single integral and can be implemented by, for example, a housing with various component parts accommodated therein or a single circuit board with various component parts mounted thereon.

FIG. 2 illustrates a circuit block diagram showing the details of the transmission unit 5. As shown therein, the digitalizing device 101 associated with the rotation detecting sensor 4 includes a timing signal generator 107, a cycle counter 108, a latcher 109, a redundant bit generator 110 and a data converter or encoder 111.

The cycle counter 108 is operable to count the number of clocks during a period subsequent to receipt of an input reset signal and prior to receipt of the next succeeding input reset signal and to output a digital count signal as a cycle data that is indicative of the count given by the cycle counter 108. The cycle data represented by this digital count signal is outputted in the form of a parallel data of a predetermined bit number. The timing signal generator 107 is operable to detect the timing at which an input pulse signal, which is the detected rotation signal outputted from the rotation detecting sensor 4, rises or decays. This timing signal generator 107 transmits a latch signal (indicative of a latch instruction) to the latcher 109 upon the detection of the timing of the rise or decay of the input pulse signal and, also, outputs the reset signal to the cycle counter 108 immediately after the detection of the rise or decay of such input pulse signal.

The latcher 109 is operable in response to receipt of the latch signal to latch the cycle data counted by the frequency cycle counter 108. Accordingly, the latcher 109 latches the data descriptive of the cycle T between the rise or decay timings tn and tn+1 of the train of pulses outputted from the rotation detecting sensor 4. During the cycle data being latched by the latcher 109, the latter 109 latches redundant bits generated by the redundant bit generator 110 according to a predetermined standard and generates a redundant bit added cycle data that corresponds to the sum of bits representative of the original cycle data plus the redundant bits. It is to be noted that the number of redundant bits may be one or more. The redundant bit added cycle data that is the parallel data having a predetermined number of bits so generated is converted by the data converter or encoder 111 into an encoded data or a digital data of a different format according to a predetermined rule. Where the data converter or encoder 111 is utilized, it is necessary for a receiver side to decode the encoded data or digital data in a manner reverse to the conversion or encoding performed by the data converter or encoder 111. It is, however, to be noted that the data converter or decoder 111 is not always essential in the present invention and may therefore be dispensed with if so desired.

The digitalizing device 102 associated with the status detecting sensor 52 for detecting the temperature of the vehicle mounted bearing assembly is a device for digitalizing by the utilization of an analog-to-digital (A/D) conversion or the like. On the other hand, the digitalizing device 103 associated with the status detecting sensor 53 for detecting the vibration occurring in the vehicle mounted bearing assembly is operable to digitalize the amplitude and cycle or the like of vibrations occurring in the vehicle mounted bearing assembly. Each of those digitalizing device 102 and 103 may include a data converter or encoder similar to that employed in the digitalizing device 101 described above.

The signal coordinating device 104 is a device for coordinating respective output signals from the digitalizing device 101 to 103 so that they can be transmitted by the single transmitting device 105 and is, in the illustrated embodiment, employed in the form of a data switching device. The signal coordinating device 104 employed in the form of the data switching device is operable to sequentially receive the respective output signals from the digitalizing device 101 to 103 by switching those signals so that they can be supplied to the transmitting device 105 one at a time. Accordingly, the cycle data, the detected temperature data and the detected vibration data are sequentially supplied one at a time from the signal coordinating device 104 to the transmitting device 105. It is to be noted that the frequency of the data inputted to the signal coordinating device 104 may be different for each of the digitalizing device 101 to 103.

In the illustrated embodiment, the transmitting device 105 is of a kind capable of performing spread spectrum communication. While any type of spread spectrum communication can be employed, a frequency hopping type is employed. The frequency hopping type is a modulation system wherein the spectrum is spread by switching the carrier frequency according to a predetermined sequence with respect to passage of time.

The transmitting device 105 includes a shift register 112, a frequency selector 113 and a transmitting circuit (not shown) for amplifying an output from the frequency selector 113 and subsequently transmitting the amplified output through an antenna. This transmitting circuit may be of a type capable of performing a wireless transmission by means of any one of radio waves, magnetic coupling, infrared beams and ultrasonic waves. The shift register 112 is operable to convert the digital data supplied one at a time from the signal coordinating device 104 into a serial output which is in turn outputted to the frequency selector 113. This shift register 112 outputs the digital data in unit of, for example, two bits. The shift register 113 is connected with a device for applying a plurality (n) of carrier waves f1 to fn at intervals of a predetermined frequency span within a bandwidth W and, accordingly, the frequency selector 113 is operable to switch over the carrier waves f1 to fn according to a predetermined sequence, that is, a predetermined hopping pattern such as f1, f2, f3, . . . and fn at predetermined time intervals. Thus, the frequency selector 113 outputs the sequentially switched carrier wave superimposed with the digital signal outputted from the shift register 112.

As discussed above, the cycle data in the form of the pulse output from the rotation detecting sensor 4 and the detected temperature and vibration data respectively from the status detecting sensors 52 and 53 are transmitted wireless by the transmitting device 105 as a wireless transmitted signal.

It is to be noted that where none of the status detecting sensors 52 and 53 are employed in the vehicle mounted bearing assembly 51 of the present invention, the signal coordinating device 104 may be dispensed with and, instead, the output from the digitalizing device 101 is inputted direct to the shift register 112 of the transmitting device 105.

With the vehicle mounted bearing assembly 51 of the structure discussed above, since the detected rotation signal from the rotation detecting sensor 4 is transmitted after having been digitalized, as compared with transmission of an analog signal a highly reliable communication can be achieved. Also, the detected temperature and vibration signals respectively from the temperature and vibration detecting sensors 52 and 53 can be sequentially switched for transmission thereof one at a time and, therefore, a satisfactory transmission is possible even though two or more status detecting sensors are employed.

Since the transmitting device 105 performs spread spectrum communication, communication robust against disturbances and/or interference can be achieved. By way of example, interfering waves and/or noises within the same frequency range can be rejected satisfactorily and the transmission is hardly affected by undesirable effects of radio wave propagation such as fading. Also, a highly secure communication is possible. Where the redundant bits are added to the digital signal to be transmitted, even though a certain frequency that is frequency hopped is disturbed, repair with the redundant bits is possible.

Since as discussed above a highly reliable transmission of the detected rotation signal can advantageously be achieved, the reliability in control of an automotive vehicle by means of the anti-lock braking system can be enhanced advantageously. Considering that the transmitting device 105 performs a wireless transmission, any connecting cable otherwise employed will not be exposed to the outside and there is no possibility of the otherwise employed connecting cable being damaged or broken. In addition, the use of the wireless transmission eliminates the need to perform a complicated and time-consuming wiring job. Those advantages afforded by the present invention lead to reduction in weight and cost of automotive vehicles. Where the rotation detecting sensor 4 is in the form of an electric power generator, no power supply line for supplying an electric power to the rotation detecting sensor is needed.

Also, where arrangement is made that an electric power generated by the rotation detecting sensor 4 comprising the electric power generator is utilized as a source of an electric power to be supplied to the various electric component parts such as the transmitting device 105, the status detecting sensors 52 and 53 and the digitalizing device 101 to 103, no connecting cables otherwise needed to connect between the vehicle mounted bearing assembly 51 and the vehicle body structure is needed. It is, however, to be noted that the rotation detecting sensor 4 need not be in the form of an electric power generator, the use may be contemplated of a device for supplying wireless an electric power between the vehicle mounted bearing assembly 51 and the vehicle body structure to thereby eliminate the possible use of any cables, although the use of the rotation detecting sensor 4 concurrently serving as the electric power generator is conveniently preferred as the structure as a whole can be simplified.

While in the foregoing embodiment a wireless transmission system is employed to communicate between the transmitting device 105 in the vehicle mounted bearing assembly 51 and a receiving device 106 mounted on the vehicle body structure at a location remote from the vehicle mounted bearing assembly 51, the transmitting device 105 referred to above may be of a type that can be used as a mobile terminal connectable to a mobile communication network as will be described later.

The physical details of the vehicle mounted bearing assembly 51 of the present invention are shown in FIGS. 3 to 7. The vehicle mounted bearing assembly 51 of the embodiment shown therein is in the form of a vehicle mounted bearing assembly. The embodiment shown therein is also directed to the wheel support bearing assembly 51 that is an inner ring rotating type of a fourth generation and is applied to the bearing assembly for rotatably supporting one of vehicle drive wheels. The vehicle mounted bearing assembly 51 shown therein includes the outer member 1 having the inner peripheral surface formed with a plurality of, for example, two raceways, the inner member 2 having the raceways defined therein so as to align with and confront the raceways in the outer member 1 and positioned inside the outer member 1 with an annular space defined therebetween, and rows of the rolling elements 3 rollingly accommodated in part within the raceways in the outer member 1 and in part within the raceways in the inner member 2. The rotation detecting sensor 4 discussed previously is disposed within the annular space delimited between the outer and inner members 1 and 2, and the wireless transmission unit 5 for transmitting wireless the detected rotation signal outputted from the rotation detecting sensor 4 is mounted externally on the outer member 1. Specifically, the rotation detecting sensor 4 within the annular space is positioned between the rows of the rolling elements 3, and the status detecting sensors 52 and 53 also discussed previously are similarly accommodated between the rows of the rolling elements 3 within the annular space and fixedly secured to the outer member 1 with the transmission unit 5 thereof. The transmission unit 5 referred to above is of a type discussed with reference to FIGS. 1 and 2 or of a type which will be subsequently discussed with reference to FIG. 18.

The outer member 1 has its inner peripheral surface formed with rows of the axially spaced raceways 6 and 7 and, similarly, the inner member 2 has its outer peripheral surface formed with the axially spaced raceways 8 and 9 at respective locations aligned with the raceways 6 and 7 in the outer member 1. The rolling elements 3 in rows are rollingly accommodated in part within the raceways 6 and 7 and in part within the raceways 8 and 9. The vehicle mounted bearing assembly 51 of the structure described is generally known as a dual row angular ball bearing assembly in which the raceways 6 to 9 have their respective contact angles so defined as to achieve a back-to-back alignment. As a matter of design, the rolling elements 3 of each row are rollingly retained by a retainer or cage 10. Opposite annular open ends of the annular space between the inner and outer members 1 and 2 are generally sealed by respective sealing elements 11 and 11A.

The outer member 1 has one end formed with a vehicle body fitting flange 1a for securement to a wheel bearing support component 12a such as a knuckle rigid with the vehicle body structure 12. The outer member 1 is of one-piece structure inclusive of the vehicle body fitting flange 1a. On the other hand, the inner member 2 has one end formed with a radially outwardly extending wheel mounting flange 2a supporting a vehicle wheel 13 by means of a plurality of connecting bolts 14.

So far illustrated, the inner member 2 is of two-piece construction including a hub wheel 2A where the wheel mounting flange 2a is formed integrally, and an inner race forming member 2B. The raceways 8 and 9 described as defined on the outer peripheral surface of the inner member 2 are specifically defined on an outer peripheral surfaces of the hub wheel 2A and an outer peripheral surface of the inner race forming member 2B, respectively. The inner race forming member 2B is in the form of a one-piece tubular structure made up of a hollow axle 16 and a generally bowl shaped outer race 15a formed integrally with one end of the hollow axle 16, which outer race 15a is a part of a constant velocity universal joint 15. In addition to the outer race 15a, the constant velocity universal joint 15 includes an inner race (not shown) coupled with any known drive axle driven by an automotive power plant in any known manner. The hollow axle 16 has a base end adjacent the outer race 15a and also has a large diametric portion 16a adjacent the base end thereof and a reduced diametric portion 16b remote from the base end with a step defined between the large and reduced diametric portions 16a and 16b. The hub wheel 2A forming a part of the inner member 2 is mounted externally on the hollow axle 16a at a location generally aligned with the reduced diametric portion 16b. While the raceway 8 is formed on the hub wheel 2A, the raceway 9 is formed on the large diametric portion 16a. The hub wheel 2A and the inner race forming member 2B are integrated together by means of plastic coupling, for example, under interference fit.

The rotation detecting sensor 4 includes a ring shaped coil/magnetic element combination 17 having a coil incorporated therein and a multi-pole magnet 18 disposed in face-to-face relation with an inner peripheral surface of the coil/magnetic element combination 17. The coil/magnetic element combination 17 is fitted to the inner peripheral surface of the outer member 1, which serves as a stationary member, and defines a stator for the electric power generator. On the other hand, the multi-pole magnet 18 is fitted to the outer peripheral surface of the inner member 2 which serves as a rotating member and, more specifically, on an outer peripheral surface of the hub wheel 2A and defines a rotor for the electric power generator. It is to be noted that the coil/magnetic element combination 17 provides a signal output side portion from which the detected rotation signal is outputted to the transmitting device 105.

The wireless transmission unit 5 is mounted on a portion of the outer peripheral surface of the outer member 1 in a circumferential direction thereof and forms a transmitter having its electronic component parts encased within an exterior housing. The housing is in the form of a box and has a transmitting antenna (not shown) accommodated therein. This wireless transmission unit 5 is, for example, a transmitter capable of transmitting signals of feeble radio waves. The signal may be of a kind capable of turning on and off radio waves or of a kind capable of modulating a carrier wave on, for example, a frequency modulation scheme. Other than that capable of transmitting by means of radio waves, the wireless transmission unit 5 may be of a kind capable of transmitting by means of a magnetic coupling, light such as infrared rays, ultrasonic waves, or any other transmitter capable of transmitting signals in the air. As an electric power source for the wireless transmission unit 5, the rotation detecting sensor 4 is used. The receiving device 106 (FIGS. 1 and 18) cooperable with the wireless transmission unit 5 is installed in, for example, a tire housing (not shown) in the automotive body structure 12, and signals from the receiving device 106 can be transmitted to a control unit of an anti-lock braking system. The receiving device 106 is fixed at a position within an unobstructed field of view of the transmission unit 5 with no metallic obstruction intervening therebetween, so that the signals such as radio waves transmitted from the transmission unit 5 can be efficiently received by the receiving device 106.

The transmission unit 5, the coil/magnetic element combination 17 of the rotation detecting sensor 4 and the status detecting sensors 52 and 53 are electrically connected in a predetermined or required wiring pattern by means of various conductive lines (not shown) for the supply of an electric power generated by the rotation detecting sensor 4 and for interfacing the respective output signals from the sensors 4, 52 and 53 between the sensors 4, 52 and 53 and the transmission unit 5. Those conductive lines are inserted in wiring holes (not shown) formed in the outer member 1 so as to extend radially across the wall of the outer member 1, which wiring holes are sealed by the use of a sealing material, for example, a wet type seal, or an elastic material. In place of the use of the conductive lines, one or more connectors (not shown) may be employed.

Figure 5A:
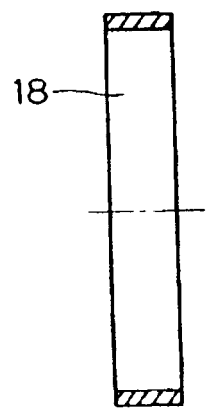
FIG. 5A is a side sectional view of a multi-pole magnet member forming a part of a rotation detecting sensor employed in the vehicle mounted bearing assembly.
Figure 5B:
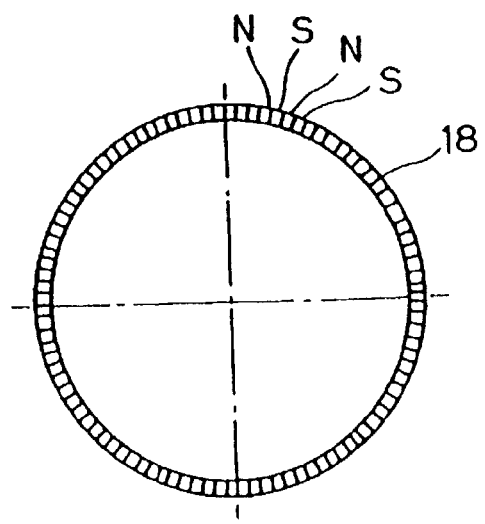
FIG. 5B is a front view of the multi-pole magnet member shown in FIG. 5A.

The rotation detecting sensor 4 that can be used in the practice of the present invention may be of a design as shown in FIGS. 5 to 7. As best shown in FIG. 5, the multi-pole magnet 18 is in the form of an annular ring member having N and S poles arranged alternately in a direction circumferentially thereof.

Figure 6A:
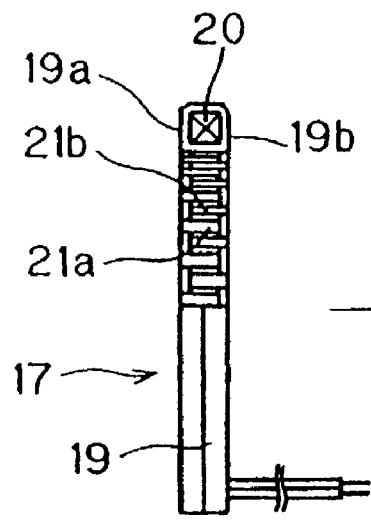
FIG. 6A is a side view, with a portion shown in section, of a ring member forming a part of the rotation detecting sensor.
Figure 6B:
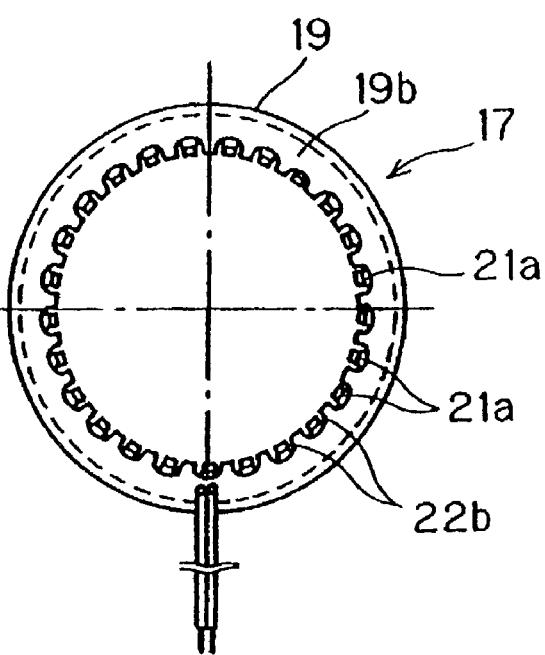
FIG. 6B is a front view of the ring member shown in FIG. 6A.
Figure 7A:
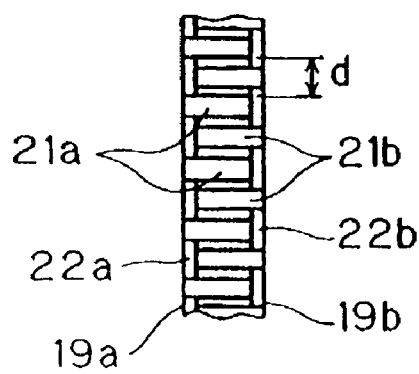
FIGS. 7A and 7B are fragmentary side and front views, on an enlarged scale, showing respective portions of the ring member shown in FIGS. 6A and 6B, respectively.
Figure 7B:
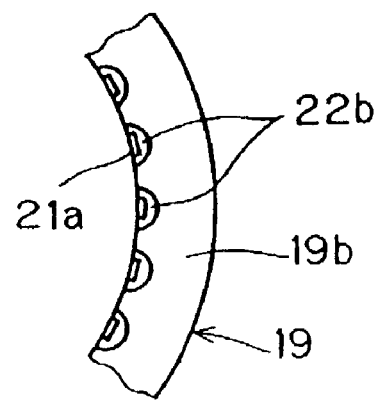

As best shown in FIGS. 6A and 6B, the coil/magnetic element combination 17 is referred to as, for example, a claw pole type in which a plurality of magnetic poles made up of claws 21a and 21b of a pole shape are arranged alternately. FIGS. 7A and 7B are diagrams which show respective portions of FIGS. 6A and 6B on an enlarged scale.

More specifically, the coil/magnetic element combination 17 includes an annular ring member 19 made of a magnetic material and a coil 20 accommodated within the ring member 19. The ring member 19 has a portion defined for accommodating the coil 20, which portion is of a groove shape in a sectional view oriented towards an inner periphery thereof, that is, the ring member 19 is of a generally U-shaped section opening radially inwardly while having radially inwardly extending annular flanges 19a and 19b forming respective side walls of the ring member 19. Inner peripheral edges of the annular flanges 19a and 19b are formed with respective comb-shaped claws 21a and 21b so as to extend in respective directions opposed to each other such that the comb-shaped claws 21a integral with the annular flange 19a are interleaved with the comb-shaped claws 21b integral with the annular flange 19b in a direction circumferentially of the ring member 19, with all of those claws 21a and 21b being spaced an equal distance from each other in a direction circumferentially of the ring member 19. Such alternate arrangement of the claws 21a and 21b forms an annular multi-pole magnet member. Each of the comb-shaped claws 21a and 21b is of a rectangular shape having its longitudinal axis extending parallel to the direction of extension of such claws 21a and 21b. The neighboring claws 21a or 21b are spaced a gap of a width d that is chosen to be, for example, three times the width of each of the claws 21a and 21b.

The inner peripheral edge of each of the annular flanges 19a and 19b of the ring member 19 is formed with a cutout 22a or 22b that is defined between the neighboring claws 21a or 21b so that a free end of each opposite claw 21b or 21a can be positioned within the corresponding cutout 22a or 22b. Each of those cutouts 22a and 22b is preferably of a semicircular shape or a generally U-shape.

This ring member 19 of the structure described above can be prepared from a metal plate of a magnetic material such as a stainless plate by the use of a press work.

It is to be noted that although the ring member 19 is shown as divided into two components along a mid-center line passing intermediate of the width thereof, that is, at the center of a web, it may be of one-piece structure.

With the vehicle mounted bearing assembly of the structure described above, since the rotation detecting sensor 4 capable of generating an electric power when one of the outer and inner members 1 and 2 rotates relative to the other of the outer and inner members 1 and 2 is employed, the number of revolutions of the wheel can be detected by utilizing the detected rotation signal outputted from the rotation detecting sensor 4 as a signal indicative of the number of revolutions of the wheel 13. Since the rotation detecting sensor 4 is built in the annular space between the outer member 1 and the inner member 2, the bearing assembly can be assembled compact while securing a function of detecting the number of revolutions. Also, since the transmission unit 5 for transmitting wireless the detected rotation signal indicative of the number of revolutions of the wheel that is outputted from the rotation detecting sensor 4, no electric cable which would otherwise be necessitated to supply the detected rotation signal indicative of the number of revolutions to the external control box is needed.

Also, an electric power generated by the rotation detecting sensor 4 is used as an electric power source for the wireless transmission unit 5 and also for the status detecting sensors 52 and 53 and, therefore, no electric cable for supplying the electric power from the automotive body structure 12 to the wireless transmission unit 5 is needed. For these reasons, no electric line is exposed outside the automotive body structure and, hence, there is no possibility of the electric lines being broken, thereby eliminating the need to perform a complicated and time-consuming wiring job and enabling the automobile to be manufactured lightweight at a reduced cost. Also, since the rotation detecting sensor 4 in its entirety is built in the annular space delimited between the outer and inner members 1 and 2, no hole which would otherwise be necessitated for exposure of a portion of the rotation detecting sensor 4 to the outside is necessary, resulting in increase of the sealability. Although a wiring hole through which the conductive lines extend between the rotation detecting sensor 4 and the wireless transmission unit 5 needs be formed in the outer member 1 as hereinabove described, those wiring holes may have a small bore size and, therefore, sealing thereof can easily be accomplished.

The rotation detecting sensor 4 is of the structure wherein the coil/magnetic element combination 17 includes the ring member 19 having the interleaved comb-shaped claws 21a and 21b, and the coil 20, which is used in combination with the ring-shaped multi-pole magnet 18. Accordingly, it is easy to attain multi-polarization and compactization and the efficient power generation excellent in efficiency of utilization of magnetic fluxes can be achieved. In particular, since the coil/magnetic element combination 17 is of the structure wherein the gaps between the interleaved claws 21a and 21b are chosen to be so large as to minimize leakage of magnetic fluxes from the neighboring magnetic poles, the efficiency of utilization of the magnetic fluxes can be high.

Figure 8A:
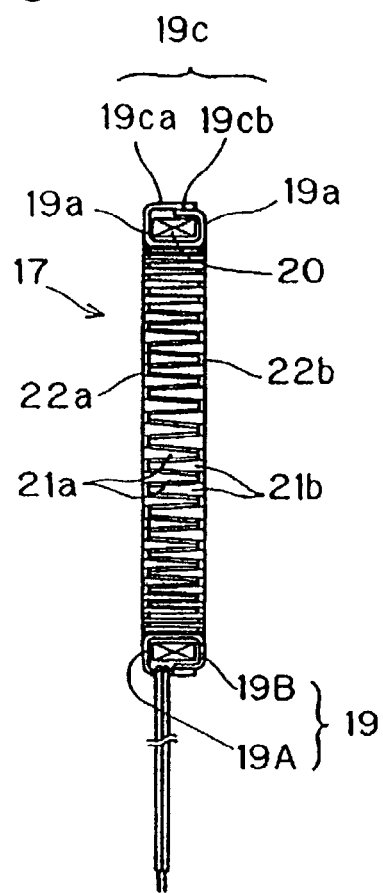
FIG. 8A is a cutaway side view of a modified form of the ring member forming a part of the rotation detecting sensor.
Figure 8B:
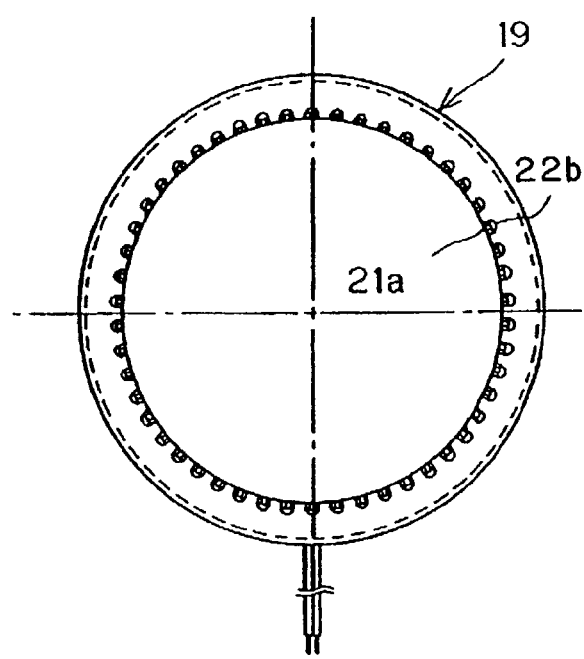
FIG. 8B is a front view of the modified form of the ring member shown in FIG. 8A.
Figure 8C:
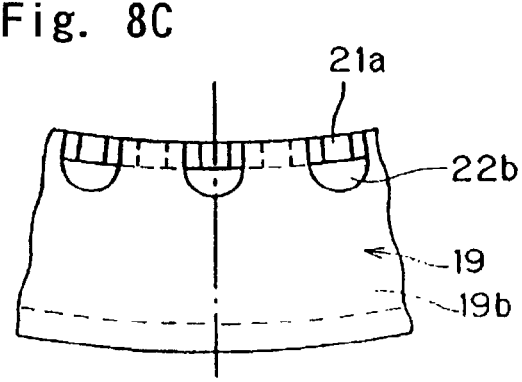
FIG. 8C is a fragmentary front view, on an enlarged scale, showing a portion of the ring member shown in FIG. 8B.

In place of the structure discussed hereinabove, the rotation detecting sensor 4 may be of a structure wherein the coil/magnetic element combination 17 is assembled as shown in FIG. 8. The coil/magnetic element combination 17 shown in FIG. 8 is featured in that each of the interleaved claws 21a and 21b of the ring member 19 is so shaped as to have its width progressively decreasing in a direction towards its free end, that is, outwardly tapered.

The ring member 19 is divided into and made up of a pair of ring segments 19A and 19B. Each of the ring segments 19A and 19B has the corresponding annular flange 19a or 19b and a plurality of web forming pieces 19ca or 19cb extending radially from an outer peripheral edge thereof, and the ring segments 19A and 19B are combined together with the web forming pieces 19ca and 19cb overlapped partly with each other in a widthwise direction thereof. Each of the ring segments 19A and 19B has its inner peripheral edge of the corresponding annular flange 19a or 19b formed with comb-shaped claws 21a or 21b that are bent to protrude in a direction perpendicular to the respective annular flange 19a or 19b. With the ring segments 19A and 19B combined together in the manner described, the comb-shaped claws 21a and 21b integral with the respective flanges 19a and 19b are interleaved with each other at intervals of a predetermined gap in a direction circumferentially thereof.

Other structural features of the coil/magnetic element combination 17 shown therein are substantially similar to those in the coil/magnetic element combination 17 shown in and described with reference to FIGS. 6 and 7. Corresponding parts of the coil/magnetic element combination 17 shown in FIG. 8 are designated by like reference numerals used in connection with the coil/magnetic element combination 17 shown in FIGS. 6 and 7.

Comparing the coil/magnetic element combination 17 having the rectangular claws 21a and 21b as shown in FIGS. 6 and 7 with the coil/magnetic element combination 17 having the tapering claws 21a and 21b as shown in FIG. 8, there is the following merits and demerits.

In the case of the coil/magnetic element combination 17 having the rectangular claws 21a and 21b as shown in FIGS. 6 and 7, it is considered best in terms of the efficiency of utilization of the magnetic fluxes, but the magnetic flux density at root portions of the claws 21a and 21b where the latter are bent from the associated annular flanges 19a and 19b tends to be high and, accordingly, they must have to a certain extend a sectional area enough to avoid magnetic saturation. For this reason, multi-polarization and reduction in size are limited.

In the case of the coil/magnetic element combination 17 having the tapering claws 21a and 21b as shown in FIG. 8, no magnetic saturation occur at the root portions of the claws 21a and 21b and, therefore, multi-polarization and reduction in size are possible. In other words, since the strength of the magnetic field between the neighboring N and S pole magnets represents a sinusoidal shape, the magnetic field at a transit point between the N pole and the S pole is very weak and, therefore, based on the assumption that little influence will be brought about even when leakage of the magnetic field between the neighboring magnetic pole claws 21a and 21b occurs, the claws 21a and 21b are tapered so that no magnetic saturation will occur at the root portions.

The reason that the ring member 19 is rendered to be a split type is only for the purpose of processing, but in the example shown in FIG. 8, the ring member 19 may be an integral part. Also, in the example as shown in FIG. 8, the ring segments 19A and 19B may be butted each other by means of web portions 19c as is the case with that shown in FIGS. 6 and 7. Also, in the example shown in FIGS. 6 and 7, the ring member 19 may be of a split type with the web forming pieces partially overlapped with each other as is the case with that shown in FIG. 8.

In the foregoing embodiment, the rotation detecting sensor 4 has been arranged between the rows of the rolling elements 3. However, the rotation detecting sensor 4 may be provided at a location adjacent one open end of the annular space between the inner and outer members 2 and 1 as shown in the following various embodiments which will be described subsequently.

Also, in the foregoing embodiment, the wireless transmission unit 5 has been used in the form of a box-type transmitter provided in a portion of the circumferential direction of the outer member 1, but the wireless transmission unit 5 may be in the form of an annular transmitter. In such case, the annular transmitter may be integrated together with the ring member 19 of the rotation detecting sensor 4.

In the description that follows, various embodiments of the present invention will be described in which the rotation detecting sensor 4 is used as a component part of the seal 11 and the wireless transmission unit 5 is employed in the form of an annular transmitter and is integrated together with the ring member of the rotation detecting sensor 4.

FIGS. 9 to 14 illustrates second to sixth preferred embodiments of the present invention, respectively. In the first place, what is common to those embodiments will be described. The vehicle mounted bearing assembly in each of those embodiments, is a vehicle mounted bearing assembly which is used to rotatably support the wheel relative to the automotive body structure 12 and includes the outer member 1 having the raceways 6 and 7 defined on the inner peripheral surface thereof, the inner member 2 having the raceways 8 and 9 opposed respectively to the raceways 6 and 7, and the rows of the rolling elements 3 rollingly accommodated between the raceways 6 and 8 and between the raceways 7 and 9, respectively. This vehicle mounted bearing assembly is in the form of a double row angular ball bearing with the contact angles of the raceways 6 to 9 so defined as to achieve the back-to-back alignment. The rolling elements 3 of each row are rollingly retained in position by the corresponding retainer or cage 10. The annular space defined between the inner and outer members 2 and 1 has opposite open ends sealed by respective sealing members 11 and 11A. The sealing member 11 is used to seal the open end on an inboard side whereas the sealing member 11A is used to seal the open end on an outboard side.

The rotation detecting sensor 4 is employed which generates an electric power upon rotation of one of the outer and inner members 1 and 2 relative to the other of the outer and inner members 1 and 2, and the wireless transmission unit 5 is also employed for transmitting wireless the signal indicative of the number of revolutions of the wheel outputted from the rotation detecting sensor 4.

The rotation detecting sensor 4 is made up of the ring member 19 made of a magnetic material and accommodating the coil 20 and the ring-shaped multi-pole magnet 18. The ring member 19 is mounted on one of the outer member 1 and the inner member 2 whereas the multi-pole magnet 18 is mounted on the other of the outer member 1 and the inner member 2. The rotation detecting sensor 4 may be either a thrust type in which the direction in which the coil/magnetic element combination 17 and the multi-pole magnet 18 are opposed to each other, that is, the direction in which magnetic poles are oriented lies in an axial direction of the bearing assembly, or of a radial type in which the direction lies in a radial direction of the bearing assembly as in the embodiment shown in FIG. 3.

At least one of the ring member 19 and the multi-pole magnet 18 is formed integrally with a sealing member which forms a part of the sealing member 11 used to close the open end of the annular space between the outer and inner members 1 and 2.

The transmission unit 5 is fabricated to have an annular shape and this annular transmission unit 5 is integrated with the ring member 19 forming a part of the rotation detecting sensor 4. The transmission unit 5 and the coil 20 are connected together by means of electric lines or connection connectors (not shown).

Hereinafter, the individual preferred embodiments of the present invention will be described.

Figure 9A:
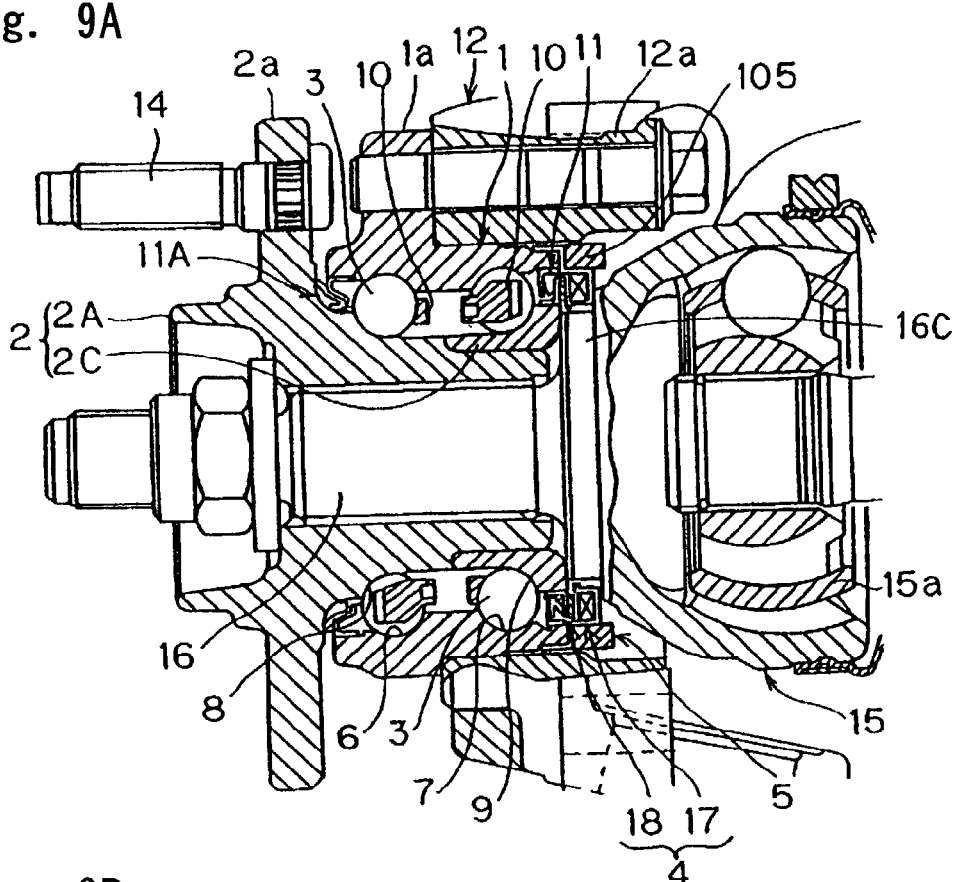
FIG. 9A is a longitudinal sectional view of the vehicle mounted bearing assembly according to a second preferred embodiment of the present invention.

The vehicle mounted bearing assembly according to the second embodiment of the present invention shown in FIG. 9A is an inner race rotating type of a third generation and is used as a wheel support bearing assembly for the support of the drive axle. The rotation detecting sensor 4 used therein is the thrust type.

The outer member 1 has the vehicle body fitting flange 1a which is, as is the case with the first embodiment, is fitted to the wheel bearing support component 12a such as a knuckle of the automobile body structure 12. The inner member 2 includes the hub wheel 2A, and a separate inner race forming member 2C mounted on an outer periphery of the end of the hub wheel 2A. The hub wheel 2A has the wheel mounting flange 2a formed integrally therewith. The raceways 8 and 9 on the inner member 2 are formed on the hub wheel 2A and the inner race forming member 2C, respectively.

The inner member 2 is coupled with the outer race 15a of the constant velocity universal joint 15 that is manufactured separate from the vehicle mounted bearing assembly. The outer race 15a of the constant velocity universal joint 15 has a hollow axle 16 formed integrally therewith so as to extend from an outer bottom portion thereof, which hollow axle 16 is inserted into an inner peripheral surface of the hub wheel 2A and is then fixed in position by means of a nut fastened thereto to thereby connect it with the inner member 2. A flat step 16c formed in the outer bottom portion of the outer race 15a of the constant velocity universal joint 15 so as to orient axially thereof is held in abutment with an end face of the inner race forming member 2C to lock the inner race forming member 2C in position.

Figure 9B:
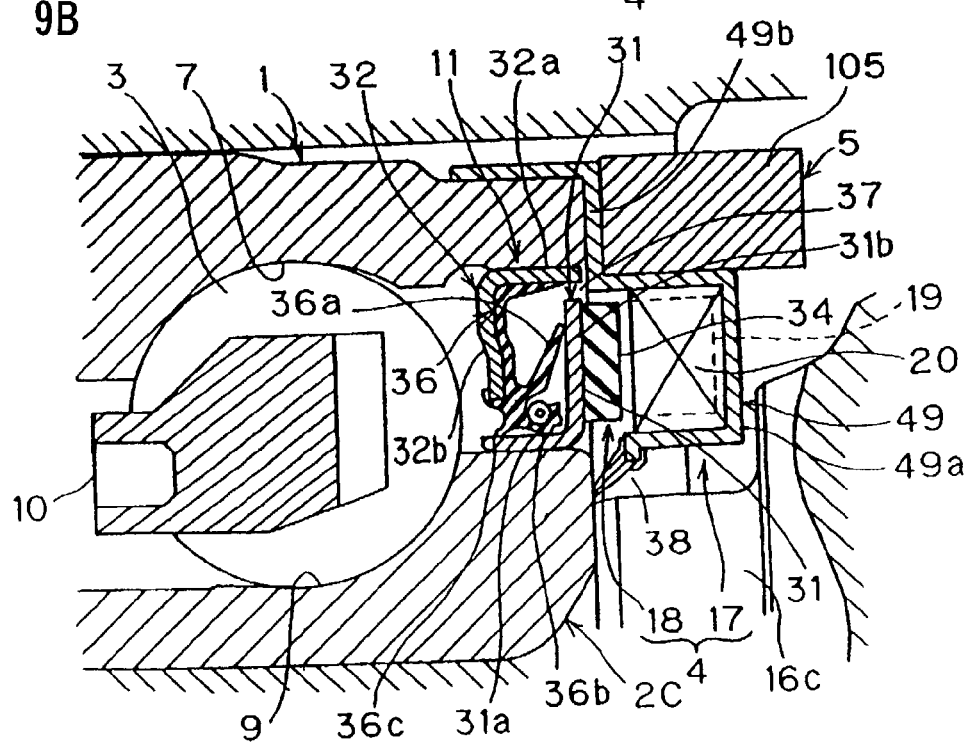
FIG. 9B is a fragmentary longitudinal sectional view, on an enlarged scale, showing a portion of the vehicle mounted bearing assembly shown in FIG. 9A.

The sealing member 11 on the bearing backside includes, as shown in FIG. 9B on an enlarged scale, first and second annular sealing members 31 and 32 fitted to the inner and outer members 2 and 3, respectively. These sealing members 31 and 32 are fitted in position as press-fitted into the inner and outer members 2 and 3, respectively. Each of the sealing members 31 and 32 is in the form of a plate-like member and is formed so as to have a generally L-sectioned shape having a cylindrical portion 31a or 32a and an upright plate portion 31b or 32b, with the sealing members 31 and 32 opposing to each other.

Figure 10:
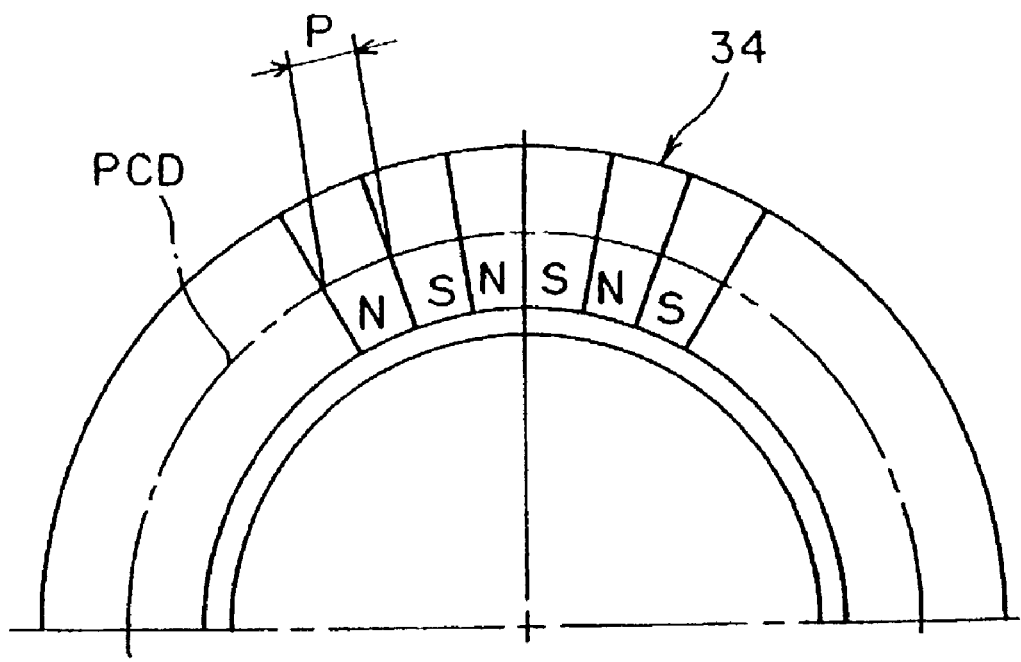
FIG. 10 is a fragmentary front view of a portion of an elastic member that forms the multi-pole magnet member of the rotation detecting sensor.

The first sealing member 31 is mounted on one of the inner and outer members 1 and 2 which serves as a rotating member, that is, the inner member 2 in the illustrated embodiment. The upright plate portion 31b of the first sealing member 31 is arranged outwardly of the bearing assembly and has an outer side face thereof provided with a magnet member 34 of the multi-pole magnet 18. This magnet member 34, as combined with the first sealing member 31 made of a magnetic material, forms the multi-pole magnet 18 of the rotation detecting sensor 4. The magnet member 34 is formed with magnetic poles N and S alternating in a circumferential direction thereof as shown in FIG. 10, and the magnetic poles N and S are arranged in a circle having a pitch circle diameter (PCD) and spaced at intervals of a predetermined pitch p. By disposing the coil/magnetic element combination 17 in face-to-face relation with the magnet member 34 of the multi-pole magnet 18 as shown in FIG. 9B, the rotation detecting sensor 4 concurrently serving as a rotation sensor can be formed.

The magnet member 34 of the multi-pole magnet 18 is made of an elastic member mixed with a powder of magnetic material and is bonded by vulcanization to the first sealing member 31 to form a so-called rubber magnet. It is, however, to be noted that instead of bonding by vulcanization of the magnet member 34, the magnet member 34 of the multi-pole magnet 18 may be prepared by hardening a mass of magnetic powders with the use of a bonding material (for example, neodymium bond magnet), which may be subsequently bonded and fixed in position to the first sealing member 31. Also, the magnet member 34 of the multi-pole magnet 18 may alternatively be made of a plastic material mixed with a powder of magnetic material.

The second sealing member 32 has formed integrally therewith a side lip 36a, slidingly engaged with the upright plate portion 31b of the first sealing member 31, and radial lips 36b and 36c slidingly engaged with the cylindrical portion 31a of the first sealing member 31. These lips 36a to 36c are provided as respective portions of the elastic member 36 that is bonded by vulcanization to the second sealing member 32. The cylindrical portion 32a of the second sealing member 32 and a free end of the upright plate portion 31b of the first sealing member 31 are spaced radially a slight distance to define a labyrinth seal 37.

The coil/magnetic element combination 17 includes the ring member 19 made of a magnetic material and accommodating the coil 20. The ring member 19 is identical with the ring member 19 used in the coil/magnetic element combination 17 described in connection with the first embodiment (FIG. 3) with reference to FIGS. 6 and 7, except that the different direction of orientation of the magnetic polarities is used. In other words, the ring member 19 shown in FIG. 9 has a cross sectional shape similar to a groove as is the case with the ring member 19 in the example of FIGS. 6 and 7 and has a plurality of the comb-shaped claws 21a and 21b that are bent at respective open edges of the side faces of the groove in a direction conforming to the opposite side faces so that the claws 21a and 21b can be alternately interleaved with each other in a direction circumferential of the ring member 19. It is, however, to be noted that the coil/magnetic element combination 17 used in the embodiment of FIG. 9 has, unlike that in FIGS. 6 and 7, the groove opening oriented axially thereof and the magnetic poles defined by the interleaved claws 21a and 22a are oriented axially accordingly. Even in the ring member 19 used in the embodiment of FIG. 9, the comb-shaped claws 21a and 21b may be tapered as is the case with those shown in FIG. 8.

Referring now to FIG. 9B, the coil/magnetic element combination 17 is fitted to a fitting ring 49 through the ring member 19, and the annular transmission unit 5 is fitted to this fitting ring 49. Thus, when the annular transmission unit 5 and the ring member 19 of the coil/magnetic element combination 17 are fitted to the same fitting ring 49, the annular transmission unit 5 and the ring member 19 of the coil/magnetic element combination 17 can be integrated together. The annular transmission unit 5 is arranged on the outer periphery of the ring member 19.

The fitting ring 49 is a component prepared from a metal plate by any known press work and has a transversely oriented groove-shaped portion 49a, in which the coil/magnetic element combination 17 is engaged, and an inverted L-shaped portion 49b extending radially outwardly from an outer peripheral open edge of the groove-shaped portion 49a and extending in the same direction as the direction of opening of the groove-shaped portion 49a. This fitting ring 49 is fitted to the outer member 1 with the inverted L-shaped portion 49b press-fitted into an outer peripheral surface of an end portion of the outer member 1. By this press-fitting, the coil/magnetic element combination 17 can be positioned in face-to-face relation with the open end of the annular space between the outer member 1 and the inner member 2 and, hence, in face-to-face relation with the multi-pole magnet 18 while the transmission unit 5 is positioned in face-to-face relation with an end face of the outer member 1.

This fitting ring 49 substantially encloses the open end of the annular space between the outer member 1 and the inner member 2 and concurrently serves as a sealing member for this open end, and a sealing member 38 for covering the remaining gap between the fitting ring 49 and the inner member 2 is fitted to an inner peripheral open edge of the groove-shaped portion 49a of the fitting ring 49. The sealing member 38 is made of an elastic material such as rubber and is held in sliding engagement with an end face of the inner member 2. This sealing member 38 is used to prevent foreign matter from entering into a gap between the ring member 19 and the magnet member 34 of the multi-pole magnet 18, both forming the respective parts of the coil/magnetic element combination 17, to thereby avoid damages to the rotation detecting sensor 4.

In this embodiment, the following functions and effects can be obtained. since the rotation detecting sensor 4 is disposed in the open end of the annular space delimited between the outer member 1 and the inner member 2, unlike the case in which the rotation detecting sensor 4 is disposed inside the bearing assembly such as in the first embodiment, the rotation detecting sensor 4 can be removed or mounted with no need to dismantle the outer member 1 and the inner member 2 of the bearing assembly and, therefore, the rotation detecting sensor 4 can easily be maintained and serviced. Also, since the multi-pole magnet 18 of the rotation detecting sensor 4 is formed integrally with the sealing member 31 at the open end of the annular space between the outer member 1 and the inner member 2, the rotation detecting sensor 4 can be assembled compact with the minimized number of component parts, thereby exhibiting an excellent assemblability.

Since the transmission unit 5 is constituted so as to have an annular shape, the transverse section of the transmission unit 5 can be reduced and can, therefore, be disposed in a limited space available in the vicinity of the bearing assembly. In other words, where the box-shaped transmission unit 5 is employed as is the case with the first embodiment shown in FIG. 3, the box-shaped transmission unit 5 is so bulky that the surroundings of the vehicle mounted bearing assembly must be so designed as to provide a sufficient space for installation of the box-shaped transmission unit 5. However, where the annular transmission unit 5 is employed, the space generally available around the wheel support bearing assembly can be utilized for installation of such annular transmission unit 5. As can readily be understood from FIG. 9, the space generally available around the wheel support bearing assembly, particularly that available in the vicinity of the open end of the annular space is often a very limited small space since it is surrounded by the constant velocity universal joint 15 and the wheel bearing support component 12a of the vehicle mounted bearing assembly. Even this very small space can accommodate the transmission unit 5 if the latter is rendered to be annular in shape. In particular, since the constant velocity universal joint 15 is positioned close to such space, such adjacent space is of a shape that can provide a room in a radial direction rather than in an axial direction. However, in the illustrated embodiment, the transmission unit 5 is arranged in overlapping relation with the outer periphery of the coil/magnetic element combination 17 and, therefore, the transmission unit 5 and the coil/magnetic element combination 17 can be effectively and snugly accommodated within such space as compared with the case in which the both are arranged axially.

Also, in the illustrated embodiment, since the annular transmission unit 5 and the ring member 19 of the rotation detecting sensor 4 are integrated together, the combination of the annular transmission unit 5 and the rotation detecting sensor 4 can be further compactized, enabling a space for installation to be easily secured and the number of component parts can also be reduced further.

Since the fitting ring 49 used to secure the coil/magnetic element combination 17 and the annular transmission unit 5 covers the multi-pole magnet 18 and, also, since the sealing member 38 is employed to seal the gap between the fitting ring 49 and the inner member 2, undesirable ingress of foreign matter into the gap between the multi-pole magnet 18 and the coil/magnetic element combination 17 can be avoided. By this fitting ring 49 and the sealing member 38, possible damages to the rotation detecting sensor 4 which would otherwise result from ingress of the foreign matter can be prevented advantageously.

The sealing member 11 provides a sealability at the bearing end portion (the open end) because of the sliding engagement between the seal lips 36a to 36c, provided in the second sealing member 32, and the first sealing member 31 and also because of the presence of the labyrinth seal 37.

Figure 11:
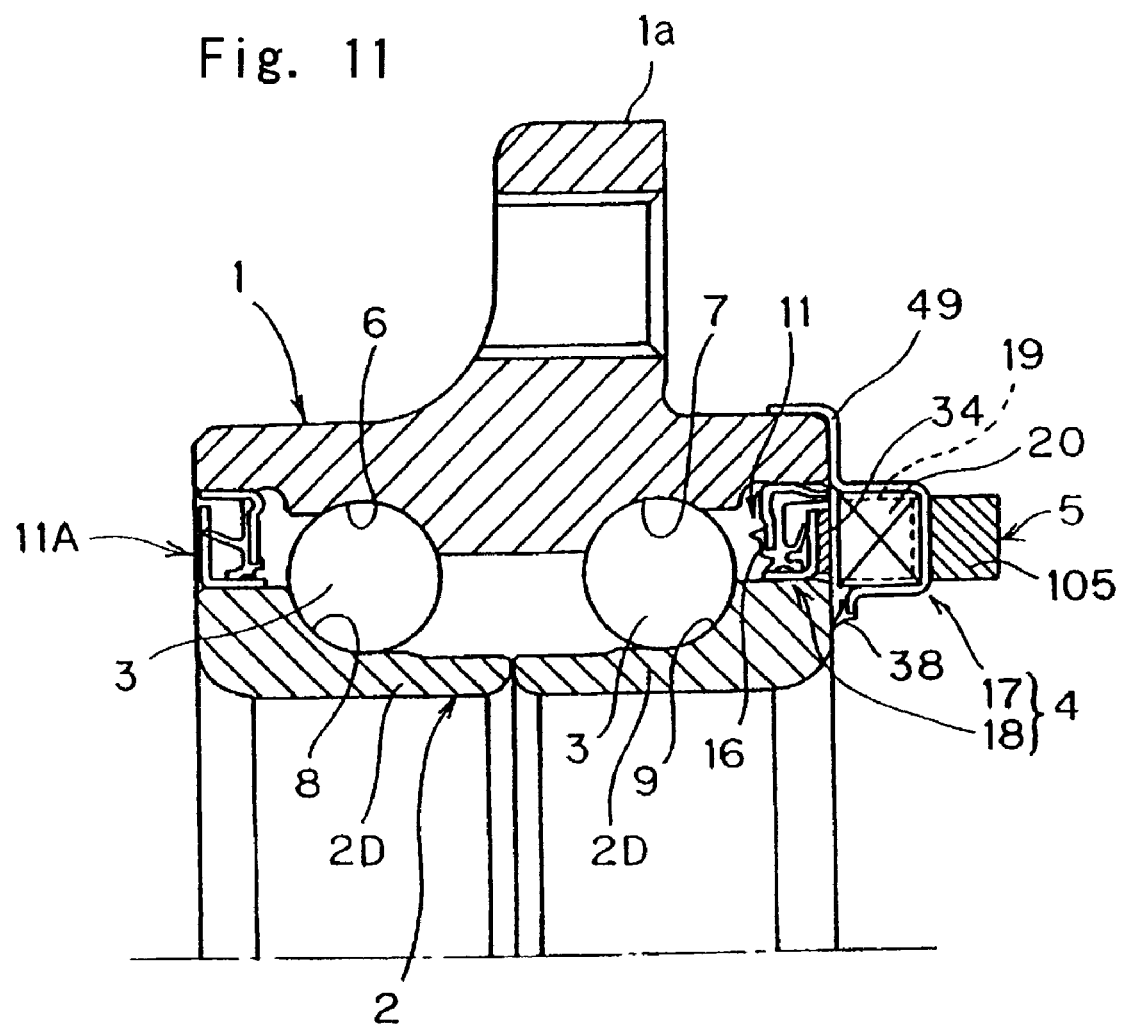
FIG. 11 is a fragmentary longitudinal sectional view showing a portion of the vehicle mounted bearing assembly according to a third preferred embodiment of the present invention.

FIG. 11 illustrates a third embodiment of the present invention. The vehicle mounted bearing assembly shown therein is a vehicle mounted bearing assembly of a second generation inner race rotating type, wherein the rotation detecting sensor 4 defining a rotation sensor is a thrust type. In this embodiment, the vehicle body fitting flange 1a referred to hereinbefore in connection with the foregoing embodiments is formed integrally with the outer member 1.

Figure 12:
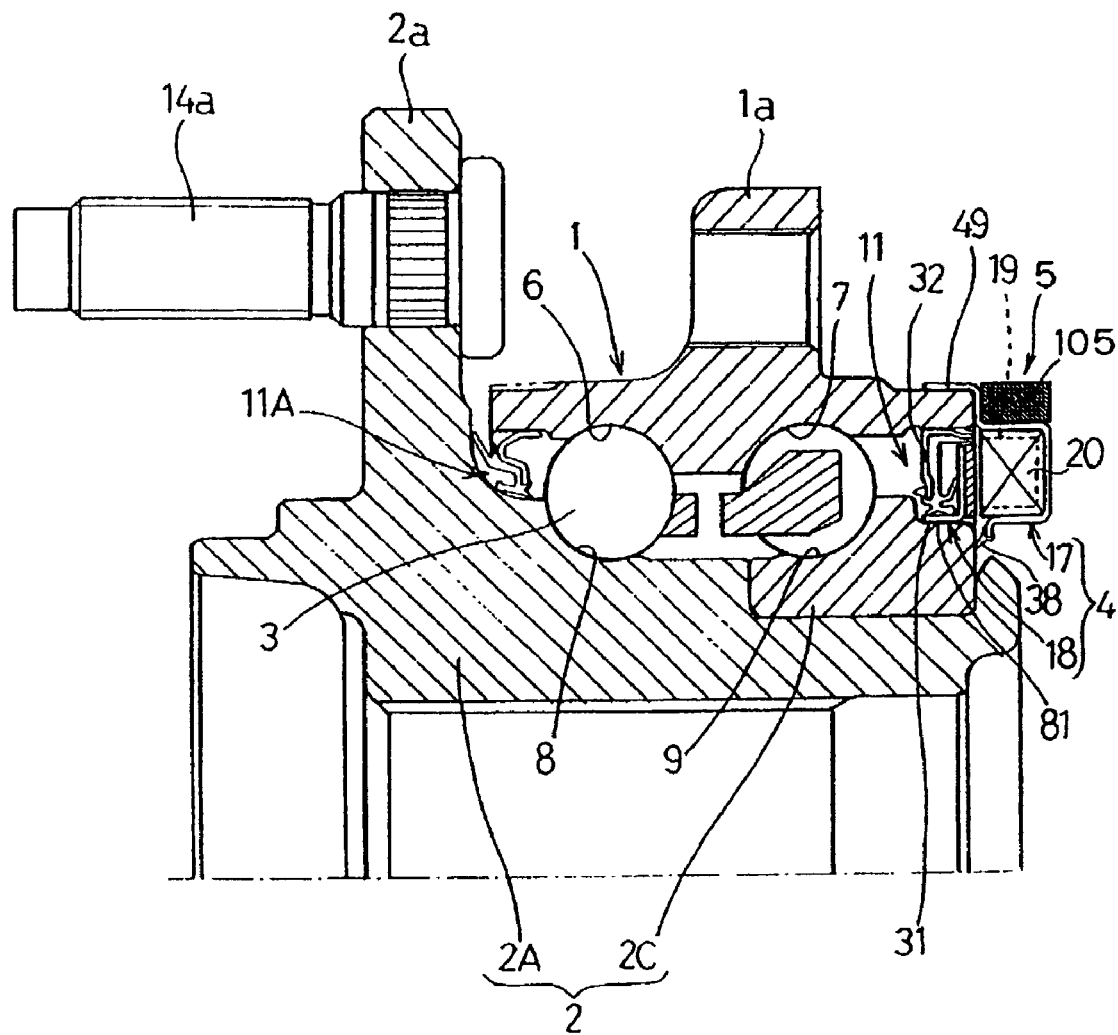
FIG. 12 is a fragmentary longitudinal sectional view showing a portion of the vehicle mounted bearing assembly according to a fourth preferred embodiment of the present invention.

FIG. 12 illustrates a fourth preferred embodiment of the present invention. The vehicle mounted bearing assembly shown therein is a vehicle mounted bearing assembly of a third generation inner race rotating type and is used for rotatably supporting the drive axle. In this embodiment, one open end of the annular space between the inner and outer members 1 and 2 of the bearing assembly, where the sealing member 11 is disposed, is provided with a reduced diameter portion 81 defined in a portion of the outer periphery of the inner race forming member 2C to provide an increased space at the open end of the annular space. This reduced diameter portion 81 can be formed by radially inwardly depressing that portion of the outer periphery of the inner race forming member 2C. In view of the increased space available by the formation of the reduced diameter portion 81, the capacity of the sealing member 11 can be increased radially inwardly so that the surface area of the multi-pole magnet 18 and the capacity of the rotation detecting sensor 4 can be increased correspondingly.

The formation of the reduced diameter portion 81 enables the use of the rotation detecting sensor 4 of a type having a reduced axial length. In other words, the rotation detecting sensor 4 even though increased in size in a radial direction can have a correspondingly reduced axial length. Thus, the structure in which the sealing member 11 is permitted to have an increased size in the radially inward direction by the provision of the reduced diameter portion 81 in the outer periphery of the inner race forming member 2C as discussed above is generally applied to the vehicle mounted bearing assembly in which the component parts including the sealing member 11 and the electric generator 4 are integrated together.

It is to be noted that in this embodiment of the present invention as discussed above, the annular transmission unit 5 is mounted externally on the coil/magnetic element combination 17 and is fixed to the fitting ring 49.

Figure 13:
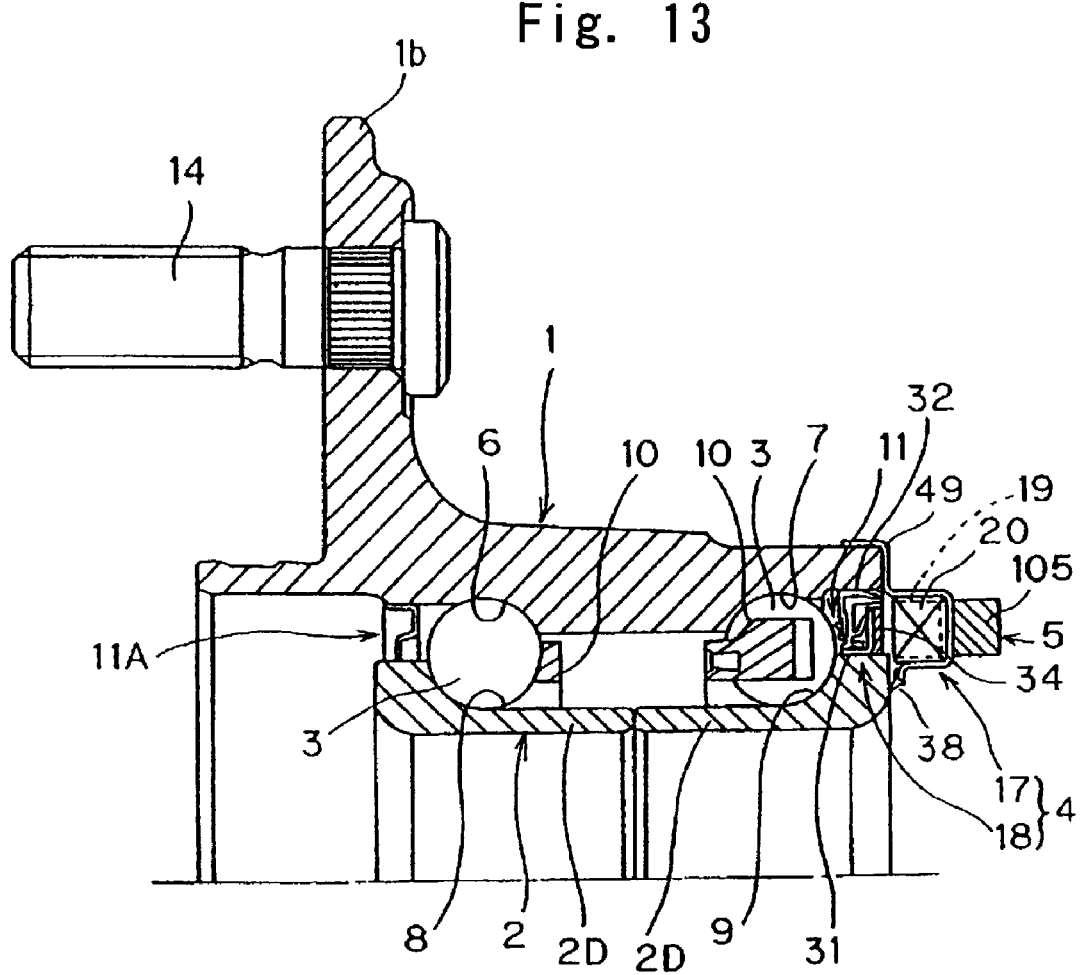
FIG. 13 is a fragmentary longitudinal sectional view showing a portion of the vehicle mounted bearing assembly according to a fifth preferred embodiment of the present invention.

A fifth preferred embodiment of the present invention is shown in FIG. 13. The vehicle mounted bearing assembly shown therein is of a second generation outer race rotating type, in which the rotation detecting sensor 4 serving as a rotation sensor used therein is of a thrust type.

The outer member 1 has a wheel mounting flange 1b formed integrally therewith at one end thereof which defines a front side thereof. The inner member 2 is of a split type in which two bearing inner races 2D are arranged axially. In this embodiment, the outer member 1 serves as a rotating member and, therefore, the transmission unit 5 mounted on the outer member 1 rotates together with the outer member 1. However, since the transmission unit 5 used therein is of an annular configuration, rotation of the transmission unit 5 together with the outer member 1 will not adversely result in variation of the detected rotation signal received by a receiving side.

Figure 14A:
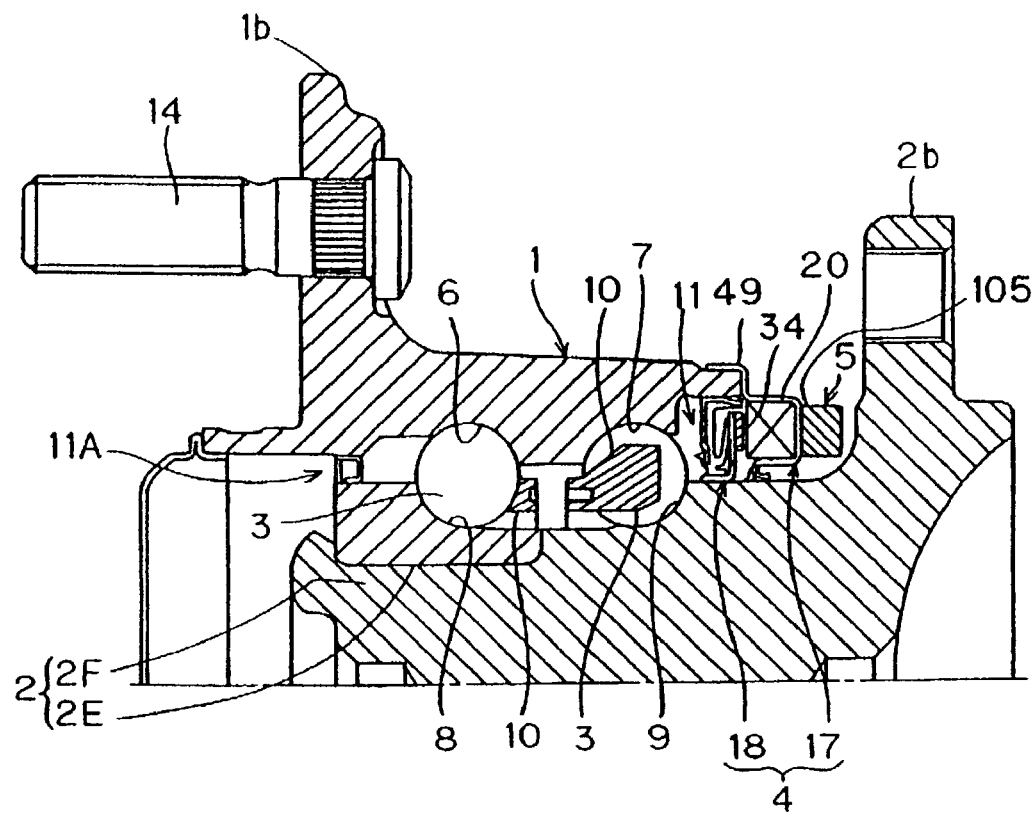
FIG. 14A is a fragmentary longitudinal sectional view showing a portion of the vehicle mounted bearing assembly according to a sixth preferred embodiment of the present invention.
Figure 14B:
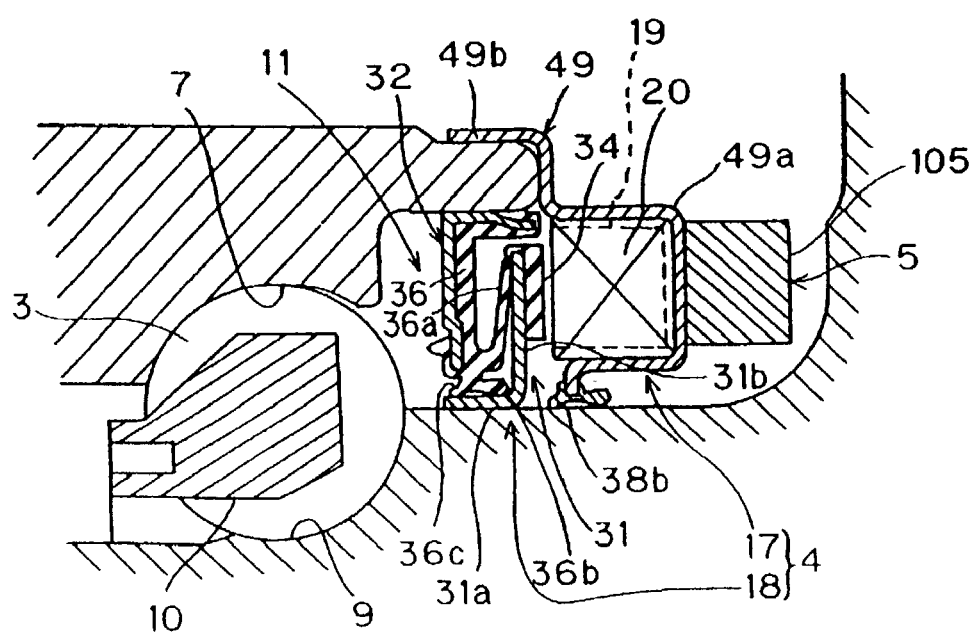
FIG. 14B is a fragmentary longitudinal sectional view, on an enlarged scale, showing a portion of the vehicle mounted bearing assembly shown in FIG. 14A.

FIGS. 14A and 14B illustrate a sixth embodiment of the present invention. This vehicle mounted bearing assembly shown therein is of a third generation outer race rotating type and is used to support the driven axle. The rotation detecting sensor 4 employed therein is a thrust type.

The outer member 1 has the wheel mounting flange 1b formed integrally therewith at one end thereof which defines a front side thereof. The inner member 2 is made up of two inner race forming members 2E and 2F, and the vehicle body fitting flange 2 discussed hereinbefore is formed integrally with the inner race forming member 2F and is spaced a distance from and positioned backwardly of one end forming a back side of the outer member 1. On the other hand, the inner race forming member 2E is positioned adjacent a front end of the inner race forming member 2F and fixed thereon by means of a staking or fastening portion provided on the inner race forming member 2F.

In this embodiment, the first sealing member 31 of the sealing member 11 is press-fitted and mounted in a portion between the raceway 9, defined on the outer peripheral surface of the inner member 2, and the vehicle body fitting flange 2b. The coil/magnetic element combination 17 of the rotation detecting sensor 4 and the transmission unit 5 are fitted to the outer member 1 by means of the same fitting ring 49, but the sealing member 38 provided in the inner peripheral portion of this fitting ring 49 is held in sliding engagement with the outer peripheral surface of the inner member 2.

In the case of this embodiment, although in the outer periphery of the inner member 2 a groove-shaped space is created between the end portion of the outer member 1 and the vehicle body fitting flange 2b, such outer peripheral space of the inner member 2 is effectively utilized to accommodate the rotation detecting sensor 4 and the transmission unit 5 since the rotation detecting sensor 4 and the annular transmission unit 5 overlap with each other in the axial direction.

Figure 15:
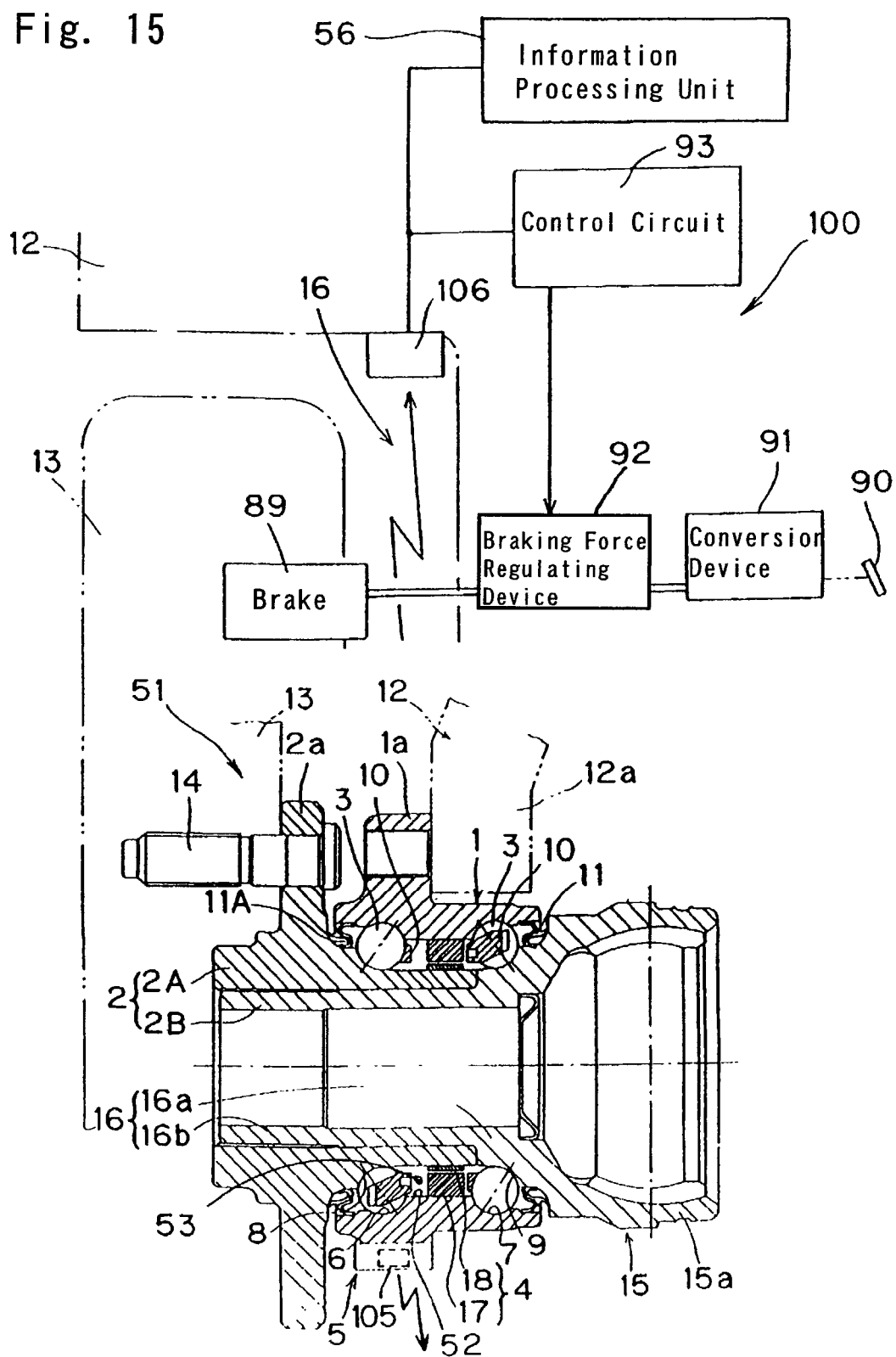
FIG. 15 is a block diagram showing an exemplary anti-lock braking system to which the vehicle mounted bearing assembly according to a seventh preferred embodiment of the present invention is applied.

FIG. 15 pertains to a seventh preferred embodiment of the present invention and illustrates a block diagram of an anti-lock braking system that is employed in combination with the vehicle mounted bearing assembly according to any one of the foregoing first to sixth embodiments. A brake 89 shown therein may be of any known design and includes a hydraulic or pneumatic cylinder operable to cause the brake to engage a friction member (not shown) such as a brake drum or brake disc secured to the wheel 13 for rotation together therewith, to thereby brake the wheel 13 then rotating. A force, that is, a pedaling force, applied to a braking member 90 such as a brake pedal or the like is, when the braking member 90 is operated, converted by a conversion device 91 into an oil hydraulic pressure proportional to the pedaling force, which is in turn transmitted to the brake 89.

A braking force regulating device 92 is a device for regulating the braking force of the brake 89 and regulates the braking force according to a command from a control circuit 93. This braking force regulating device 92 is provided on an oil hydraulic circuit at a location between the brake 89 and the conversion device 92.

The control circuit 93 is a device for applying a braking force regulation command to the braking force regulating device 92 according to the number of wheel revolutions detected by the rotation detecting sensor 4 and is constructed of an electronic circuitry such as a microcomputer. The detected rotation signal outputted from the rotation detecting sensor is transmitted wireless from the wireless transmitting device 105 to the receiving device 106 and is then inputted from the receiving device 106 to the control circuit 93. The anti-lock braking system 100 selects and utilizes only the detected rotation signals, outputted from the rotation detecting sensor 4, from the various signals received by the receiving device 106.

The sensor output signals outputted respectively from the detecting sensors 4, 52 and 53 and subsequently received by the receiving device 106 are supplied to an information processing unit 56. This information processing unit 56 may be in the form of a computer utilized in any automotive vehicle for performing various controls of the automotive vehicle and for any other purposes. The information processing unit 56 has a functionality as a mobile terminal of the mobile communication network as will be described later and can therefore has a function of transmitting the sensor output signals, which have been inputted thereto through the receiving device 106, to a diagnosing unit, a determining unit and others of a remote monitoring system over the mobile communication network. It is to be noted that the information processing unit 56 may be of a type capable of concurrently working as the control circuit 93 of the anti-lock braking system 100.

It is also to be noted that other than used in the anti-lock braking system 100, the detected rotation signal outputted from the rotation detecting sensor 4, so far used in controlling the automotive vehicle, may also be used in an electronic control system (ARS system) for controlling the steering angle of automobile rear wheels particularly where the automotive vehicle is of a front wheel drive type.

Figure 16:
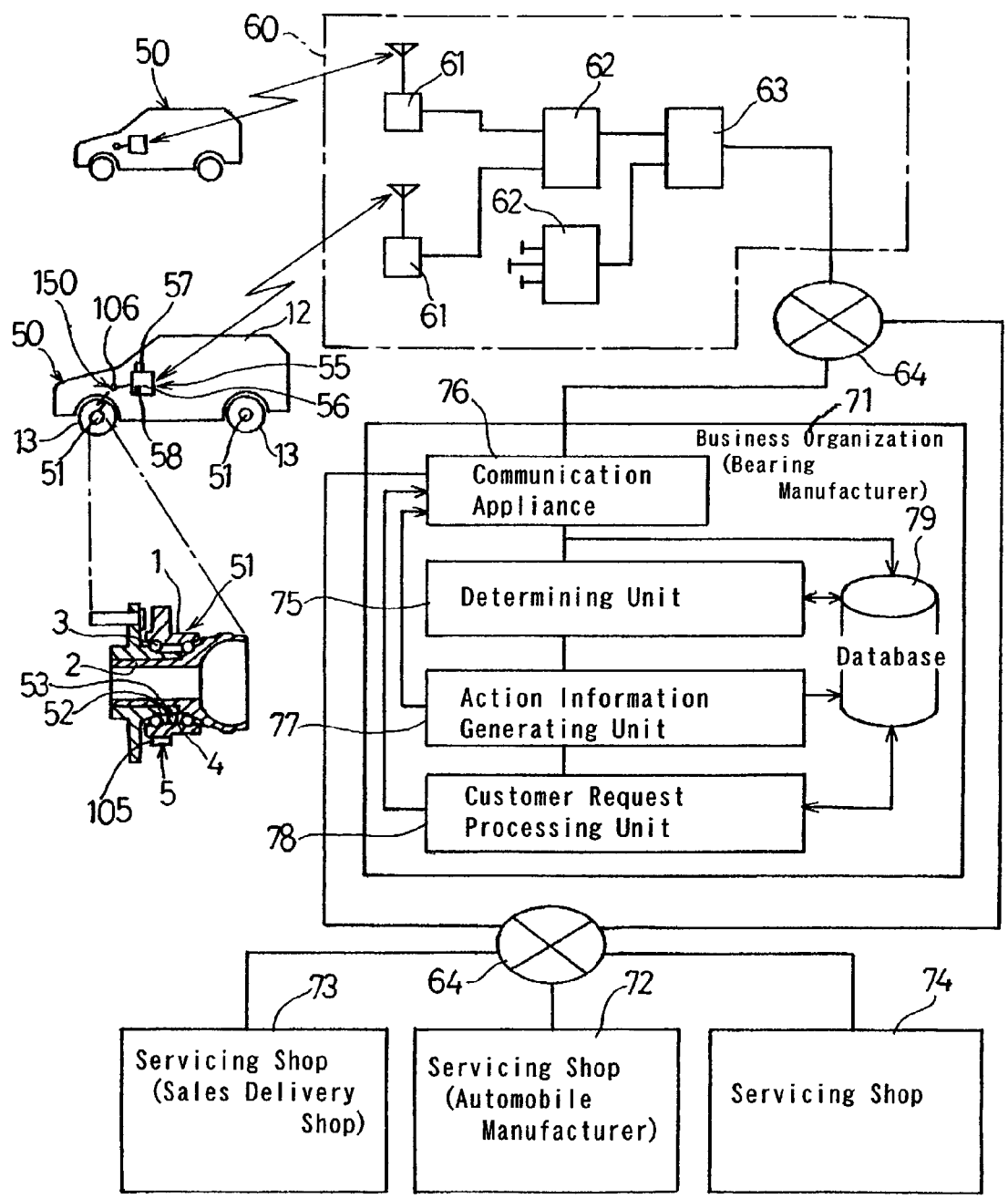
FIG. 16 is a block diagram showing a conceptual construction of a remote monitoring system for monitoring a detected rotation signal outputted from the vehicle mounted bearing assembly according to an eighth preferred embodiment of the present invention.

FIG. 16 illustrates an eighth preferred embodiment, showing an exemplary remote monitoring system utilizing the sensor output signals from the various detecting sensors 4, 52 and 52 in the vehicle mounted bearing assembly 51 for monitoring statuses of the vehicle mounted bearing assembly 51. As a matter of design, the vehicle mounted bearing assembly 51 including the detecting sensors 4, 52 and 53 may be employed for each of the wheels 13 of the automotive vehicle 50. The automotive vehicle 50 is equipped with a vehicle mounted communication unit 55 for transmitting wireless the sensor output signals, which are outputted from the associated detecting sensors 4, 52 and 53 and subsequently transmitted to the transmission unit 5 in the respective vehicle mounted bearing assembly 51, to the mobile communication network 60. This vehicle mounted communication unit 55 includes a wireless communication unit 150 that is made up of the transmission unit 5 provided in the vehicle mounted bearing assembly 51 and the receiving device 106 mounted on the vehicle body structure 12 for receiving the sensor output signals which have been transmitted wireless from the transmission unit 5, and the information processing device 56 that is mounted on the vehicle body structure 12 and serves as a mobile terminal for processing the sensor output signals received by the receiving device 106 and for subsequently transmitting the processed signals wireless to the mobile communication network 60. A business organization 71 located remote from the automotive vehicle 50 is provided with a determining unit 75 for diagnosing predetermined particulars associated with the respective vehicle mounted bearing assembly 51 in reference to the sensor output signals outputted respectively from the detecting sensors 4, 52 and 53 and subsequently communicated thereto over the mobile communication network 60.

It is to be noted that the automotive vehicle 50 herein referred to may be any type of motor cars such as a passenger car, truck, bus and construction vehicle.

The mobile communication network 60 may be of any configuration provided that wireless communication is possible with any movable body, and one or a combination of a communication network for mobile cellular telephones, a communication network for automobile telephones, a communication network for PHSs (Personal Handy-phone Systems), mobile satellite communication network or the like can be employed therefor.

So far shown in FIG. 16, the mobile communication network 60 is that for mobile cellular telephones and is made up of a base station 61, a base station control device 62 and a mobile switching device 63, with communication to and from the mobile terminal such as the information processing device 56 taking place via the base station 61. The mobile switching device 63 is connected with any other communication networks 64 such as a general subscribers' local network, ISDN network or any other mobile communication network through which communication can be made with the business organization 71.

The information processing device 56 serving as the mobile terminal of the vehicle mounted communication unit 55 is preferably of a type capable of achieving a two-way communication. The sensor output signals transmitted wireless from the information processing device 56 through the mobile communication network 60 may be either an analog signal or a digital signal.

The automotive vehicle 50 has mounted thereon a terminal equipment 57 of a car navigation system such as a global positioning system (a positional information detecting system) which is electrically connected with the information processing device 56. This car navigation terminal equipment 57 and the information processing device 56 may share a single image display device such as a liquid crystal display with each other or may employ an image display unit for each of them.

The information processing device 56 may be of a type capable of not only processing the sensor output signals transmitted from the vehicle mounted bearing assembly 51 and then received by the receiving device 106, but also processing information received from other sensors used to detect respective statuses of the automotive vehicle 50. The automotive vehicle may be of an electronically controlled vehicle and is therefore equipped with various sensors for the conveniences of a vehicle driver and for safety purpose, information from those various sensors are processed by the information processing device 56 as well. The information processing device 56 may also be used for processing information for versatile purposes not closely related to the operation of the automotive vehicle 50.

Also, the information processing device 56 may include a vehicle mounted determining device 58 for determining predetermined particulars in reference to the sensor output signals received by the receiving device 106 and for providing a guidance of the result of the determination performed thereby. This determination performed by the vehicle mounted determining device 58 may be limited to a relatively simple determination. By way of example, the vehicle mounted determining device 58 may be of a type operable to compare the detected temperature or vibration signal, contained in the sensor output signals received by the receiving device 106, with a predetermined threshold value and to provide a predetermined warning in the event that the detected temperature or vibration signal exceeds the predetermined threshold value.

Hereinafter, the business organization 71 and the determining unit 75 used therein will be described. The business organization 71 provided with the determining unit 75 may be one of a bearing manufacturer, an automobile manufacturer, an automobile sales outlet and an automobile servicing and maintenance shop. So far shown in FIG. 16, the business organization 71 provided with the determining unit 75 is shown as a bearing manufacturer.

The sensor output signals are transmitted from the vehicle mounted communication unit 55 through the mobile communication network 60 to a communication appliance 76 that is connected with the mobile communication network 60 or the other communication network 64 and are then inputted to the determining unit 75 through the communication appliance 76. This determining unit 75 when receiving the sensor output signals from the communication appliance 76 refers to the sensor output signals to diagnose predetermined particulars related with the vehicle mounted bearing assembly 51. As discussed hereinbefore, the sensor output signals include the detected rotation signal indicative of the number of revolutions of the vehicle wheel, the detected temperature signal indicative of the temperature of the vehicle mounted bearing assembly 51 and the detected vibration signal indicative of the frequency of vibrations induced in the vehicle mounted bearing assembly 51. The determining unit 75 performs the diagnosis by comparing each of those sensor output signals with a predetermined range to perform a determination of whether the respective sensor output signal is within the predetermined range or a stepwise determination.

In addition to the determining unit 75, the business organization 71 is also provided with an action information generating unit 77 and a database 79, with or without a customer request processing unit 78 as an optional element that may be employed depending on the necessity. The determining unit 75, the action information generating unit 77 and the customer request processing unit 78 are all incorporated in a computer (not shown).

The action information generating unit 77 is an unit for generating information on an action to be taken to any abnormality occurring in the vehicle mounted bearing assembly 51 depending on the result of the determination (diagnosis) performed by the determining unit 75. This action information generating unit 77 has a capability of transmitting the information on the action so generated to the automotive vehicle 50 through the mobile communication network 60.

Specifically, the action information generating unit 77 performs a process of selecting one of shops including servicing shops 74 where the automotive vehicle 50 is serviced and delivery shops 73 where a business of servicing is conducted, and includes the selection information in the action information generated thereby. This action information generating unit 77 transmits the action information so generated to the selected shop 73 or 74 and also provides the automotive vehicle 50 with a guidance message, that is necessary to guide the automotive vehicle 50 towards the selected shop 73 or 74, together with the action information and/or information on the result of the determination performed by the determining unit 75.

The vehicle driver of the automotive vehicle 50 can view the information on an abnormality in the vehicle mounted bearing assembly that is represented by the result of the determination performed by the determining unit 75, so that the vehicle driver can take a preventive action against the abnormality in the vehicle mounted bearing assembly 51 and/or views the guidance information on the servicing shops 73 and 74 so that he or she can drive the automotive vehicle 50 to the selected servicing shop 73 or 74. An attendant servicing person at the selected servicing shop 73 or 74 when viewing the action information can prepare component parts of the vehicle mounted bearing assembly 51 that is to be, for example, replaced before the automotive vehicle having a trouble in one or some of the vehicle bearing assemblies arrives at such selected servicing shop 53 or 54 and, therefore, replacement of one or some of the vehicle bearing assemblies if so required can be performed quickly.

Figure 17:
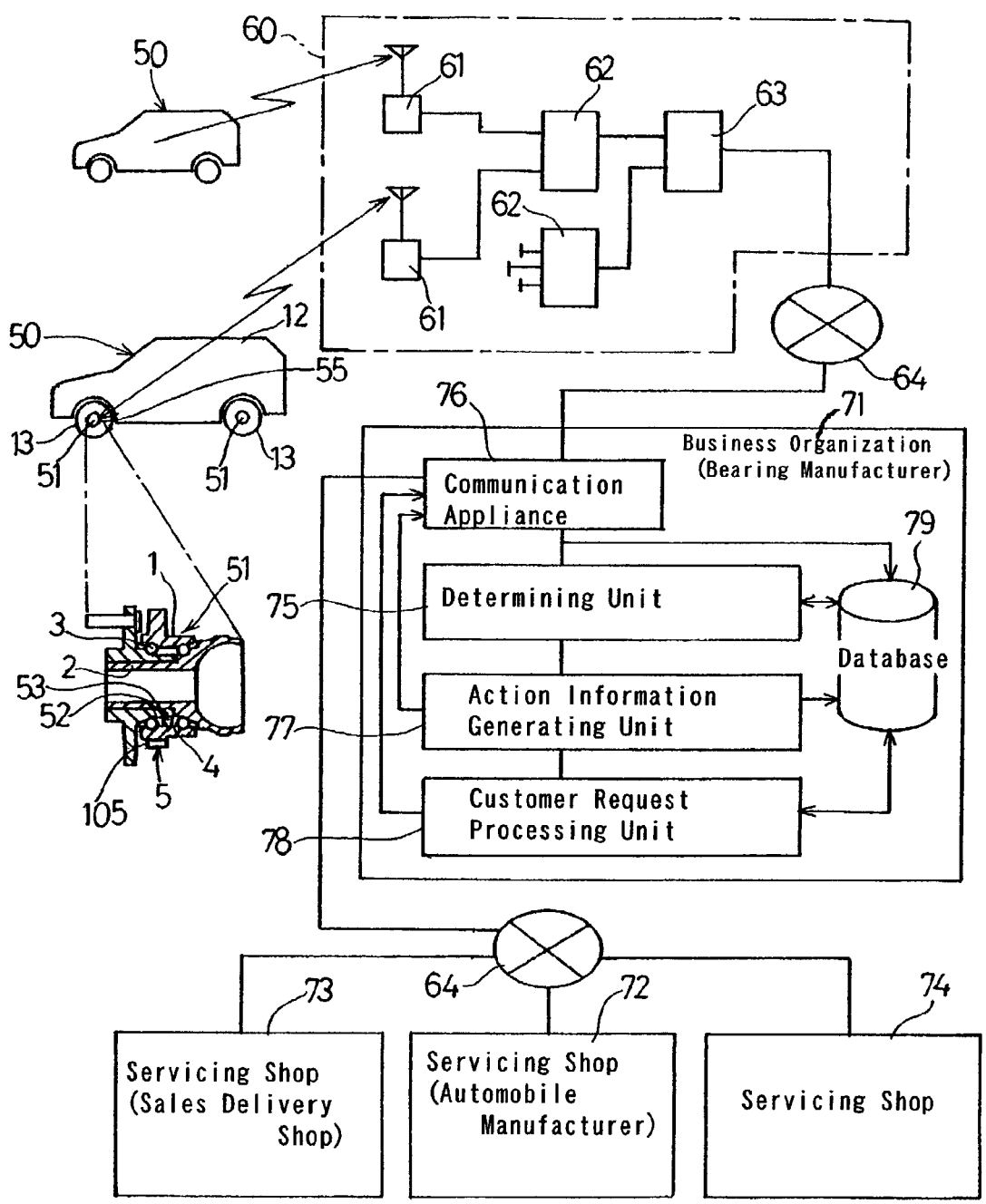
FIG. 17 is a block diagram showing a different conceptual construction of the remote monitoring system for monitoring the detected rotation signal outputted from the vehicle mounted bearing assembly according to a ninth preferred embodiment of the present invention.

FIG. 17 illustrates a ninth preferred embodiment of the present invention. This ninth embodiment differs from that shown in FIG. 16 in that a device serving as the mobile terminal that performs a wireless communication the mobile communication network 60 is constituted by the transmitting device 105 of the transmission unit 5 mounted on the vehicle mounted bearing assembly 51. In other words, the vehicle mounted communication unit 55 is comprised of the transmitting device 105.

The business organization 71 that receives the sensor output signals through the mobile communication network 60 is shown as a bearing manufacturer as is the case with the previously described embodiment of FIG. 16 and, hence, as is the case with the embodiment of FIG. 16, this business organization 71 is provided with the action information generating unit 77 with or without the customer request processing unit 78 as an optional element that may be employed depending on the necessity. The determining unit 75 and the action information generating unit 77, both employed in the business organization 71 shown in FIG. 17 may be provided in any of the servicing shops 72 to 74 as is the case with the previously described embodiments.

Figure 18:
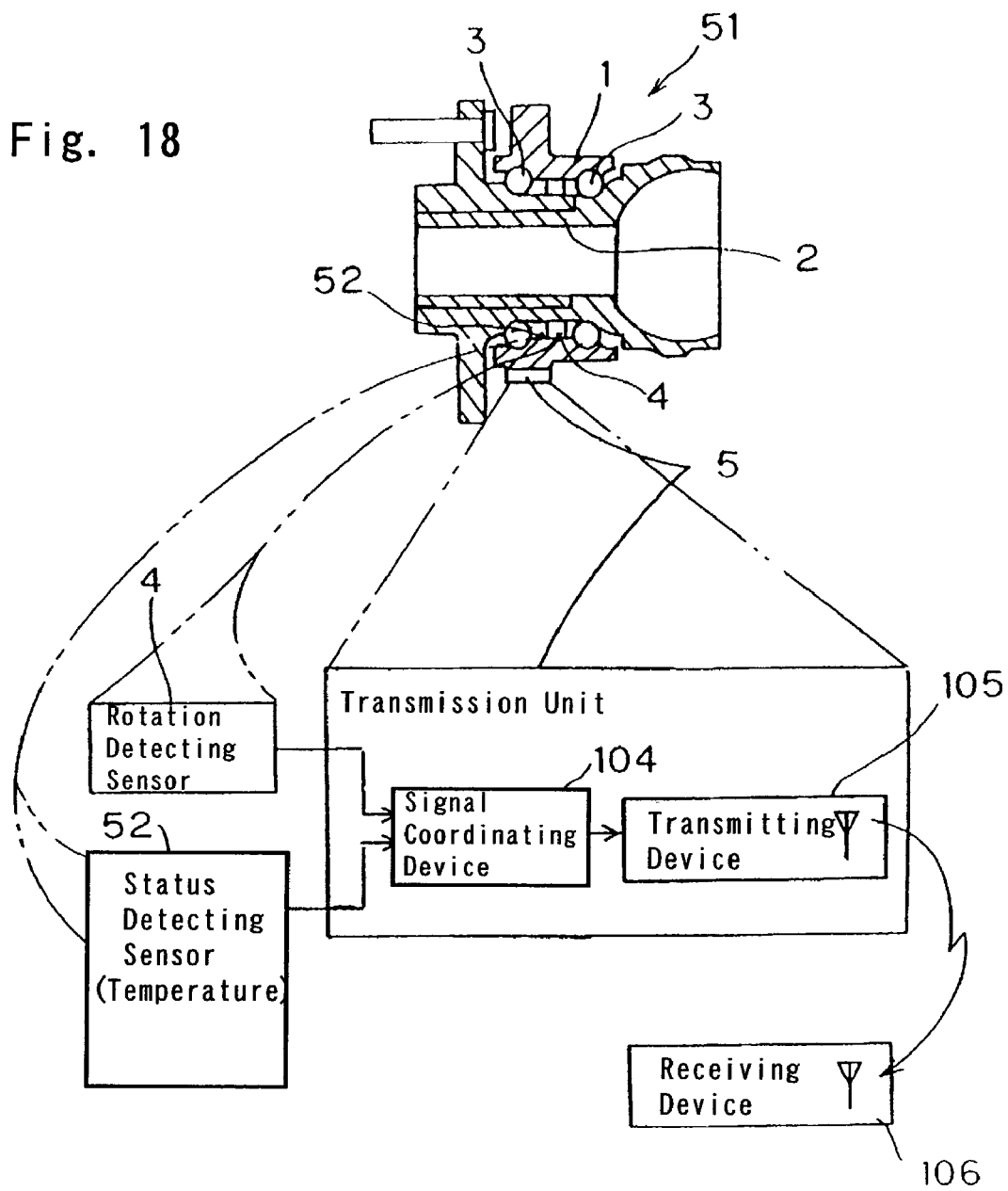
FIG. 18 is a block diagram showing a conceptual construction of the vehicle mounted bearing assembly according to a tenth preferred embodiment of the present invention.
Figure 19:
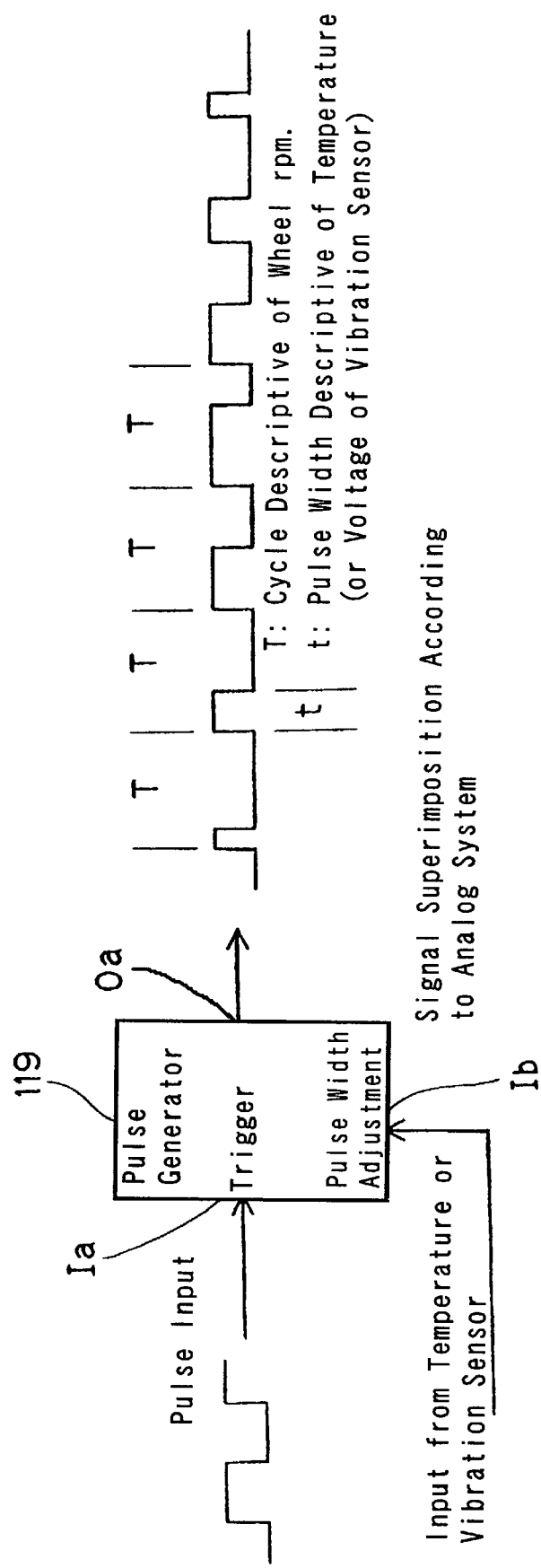
FIG. 19 is an explanatory diagram showing an exemplary process of superimposing signals performed by a signal coordinating device.

A tenth preferred embodiment of the present invention is shown in FIGS. 18 and 19. In this tenth embodiment, an analog signal transmission system is employed. As is the case with the first embodiment of the present invention, the vehicle mounted bearing assembly 51 shown therein is for rotatably supporting the vehicle wheel relative to the vehicle body structure and includes the outer member 1 having an inner peripheral surface formed with axially spaced apart raceways, the inner member 2 having raceways defined therein in alignment with the raceways in the outer member 1 and rows of rolling elements 3 accommodated in the annular space between the inner and outer members 2 and 1 and rollingly received in part within the respective raceways in the outer member 1 and in part within the respective raceways in the inner member 2.

This vehicle mounted bearing assembly 51 is provided with the rotation detecting sensor 4 for detecting rotation of one of the outer and inner members 1 and 2 relative to the other of the outer and inner members 1 and 2 and the transmitting device 105 for transmitting wireless an analog sensor output signal outputted from the rotation detecting sensor 4 and indicative of the number of revolutions of the vehicle wheel. Other structural features of the vehicle mounted bearing assembly 51 shown in FIG. 18 are similar to those shown and described in connection with the first embodiment with reference to FIG. 1 and, therefore, the details thereof are not reiterated for the sake of brevity.

The signal coordinating device 104 and the transmitting device 105 are united into the single transmission unit 5 which is in turn mounted on one of the outer and inner members 1 and 2 of the vehicle mounted bearing assembly 51 that serves as the stationary member, that is, the outer member 1 so far shown. The transmission unit 105 is of a design that can be handled as a single component part and may be encased within a housing together with various component parts accommodated therein or a single circuit board with various component parts mounted thereon.

The transmitting device 105 includes a transmission circuit (not shown) operable for amplifying a signal, which has been superimposed by the signal coordinating device 104 and for then transmitting the signal into the air through an antenna. This transmission circuit may be of a type capable of performing a wireless transmission by means of any one of radio waves, magnetic coupling, infrared beams and ultrasonic waves.

In the vehicle mounted bearing assembly 51 with those structural features discussed above, since in addition to the rotation detecting sensor 4 a status detecting sensor 52 for detecting a different status other than the rotation of the vehicle wheel is employed and the sensor output signals respectively from the rotation detecting sensor 4 and the status detecting sensor 52 are transmitted wireless by the transmitting device 105, not only can the number of revolutions of the vehicle wheel be detected, but the status of the vehicle mounted bearing assembly 51 can also be monitored. In other words, diagnosis of the vehicle mounted bearing assembly 51 can be performed in reference to the sensor output signal generated and transmitted from the status detecting sensor 52, so that a preventive action can be taken to any possible trouble occurring in the vehicle mounted bearing assembly 51 and/or servicing and maintenance of the vehicle mounted bearing assembly 51 can be facilitated.

Also, since the signal coordinating device 104 is employed so that the sensor output signals from the detecting sensors 4 and 52 can be transmitted wireless by the single transmitting device 105, it is possible to utilize the transmitting device 105, which has hitherto been used solely for transmitting the detected rotation signal, for concurrently transmitting the detected status signal from the status detecting sensor 52 with a simplified structure and without rendering a structural component such as the transmission circuit being complicated. The signal coordinating device 104 employed is in the form of a signal superimposing device and, therefore, a single composite signal including a signal component representative of the detected rotation signal and a signal component representative of the detected status signal can be transmitted, thus rendering the transmitting device 105 to be assembled compact and simplified in structure.

Since the transmitting device 105 transmits the signals wireless, no connecting cables otherwise employed is exposed to the outside, eliminating the risk of the cable being damaged or broken and, also, eliminating the need to perform a complicated and time-consuming wiring job. Those advantages afforded by the present invention lead to reduction in weight and cost of automotive vehicles. Where the rotation detecting sensor 4 is in the form of an electric power generator, no power supply line for supplying an electric power to the rotation detecting sensor 4 is needed.

Also, where arrangement is made that an electric power generated by the rotation detecting sensor 4 comprising the electric power generator is utilized as a source of an electric power to be supplied to the various electric component parts such as the transmitting device 105 and the status detecting sensor 52, the use of connecting cables otherwise needed to connect between the vehicle mounted bearing assembly 51 and the vehicle body structure can advantageously be eliminated completely. It is, however, to be noted that the rotation detecting sensor 4 may not be in the form of an electric power generator and in such case the use may be contemplated of a device for supplying wireless an electric power between the vehicle mounted bearing assembly 51 and the vehicle body structure to thereby eliminate the possible use of any cables, although the use of the rotation detecting sensor 4 concurrently serving as the electric power generator is conveniently preferred as the structure as a whole can be simplified.

FIG. 19 illustrates an example of processing an analog signal transmitted by superimposing the sensor output signal from the status detecting sensor 52 on the detected rotation signal outputted from the rotation detecting sensor 4. A pulse generator 119 is provided in the transmission unit 5 shown in FIG. 18 and has a trigger input terminal Ia, a pulse width adjusting input terminal Ib, and a pulse output terminal Oa. This pulse generator 119 is operable to perform a pulse width modulation on an input pulse signal, supplied to the trigger input terminal Ia, by means of a signal inputted to the pulse width adjusting input terminal Ib and then to output the pulse-width modulated signal from the pulse output terminal Oa. The input pulse to the trigger input terminal Ia is the detected rotation signal outputted from the rotation detecting sensor 4 (FIG. 18) and the signal inputted to the pulse width adjusting input terminal Ib is the detected status signal outputted from the status detecting sensor 52. Accordingly, the pulse output emerging from the pulse output terminal Oa is a train of pulses outputted at the same cycle T as the input pulse and having a pulse width t corresponding to the detected status signal from the status detecting sensor 52. Because of this, the cycle T of the train of the pulses outputted from the pulse output terminal Oa is descriptive of the number of the revolution of the vehicle wheel whereas the pulse width t of the train of the pulses is descriptive of the voltage of the status detecting sensor 52 which is, in the illustrated embodiment, a vibration detecting sensor or a temperature detecting sensor. The pulse-width modulated signal emerging from the pulse generator 119 is transmitted wireless from the transmitting device 105 of the transmission unit 5 shown in FIG. 18.

It is to be noted that although in the foregoing embodiment the signal coordinating device 104 is designed to accomplish the signal superimposition by means of a pulse width modulation technique, any suitable signal superimposing system such as, for example, height variation technique may be employed for the signal coordinating device 104.

Also, while in the foregoing embodiment only one status detecting sensor 52 has been referred to, two or more status detecting sensors 52 for detecting a plurality of statuses may be employed and, for example, a temperature detecting sensor and a vibration detecting sensor may be employed as is the case with the embodiment shown in and described with reference to FIG. 1. In such case, the signal coordinating device 104 may be so designed that the detected status signals outputted from those respective status detecting sensors 52 can be coordinated with, i.e., superimposed on the detected rotation signal outputted from the rotation detecting sensor 4, prior to being transmitted through the transmitting device 105.

Moreover, although in the foregoing embodiment a wireless communication system has been employed between the transmitting device 105 in the vehicle mounted bearing assembly 51 and the receiving device 106 in the vehicle body structure, it is to be noted that the transmitting device 105 referred to above may be of a type that can be used as a mobile terminal connectable to the mobile communication network.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in any one of the foregoing embodiments the vehicle mounted bearing assembly has been used in the form of the wheel support bearing assembly, the present invention can be equally applied to any other vehicle mounted bearing assembly that supports any shaft used in automotive vehicles. Also, the present invention can find its application in any bearing assembly such as used in supporting wheels used in railway cars.

Accordingly, such changes and modifications are, unless they depart from the scope of the present invention as delivered from the claims annexed hereto, to be construed as included therein.

What is claimed is:

1. A vehicle mounted bearing assembly, operable to rotatably support a vehicle wheel relative to a vehicle body structure, which comprises:
    an outer member having an inner peripheral surface formed with at least two axially spaced apart raceways;
    an inner member positioned inside the outer member and having raceways defined therein in cooperative relation with and in alignment with the raceways in the outer member;
    rows of rolling elements positioned within an annular space, delimited between the inner and outer members, and accommodated in part within the raceways in the outer member and in part within the raceways in the inner member;
    a rotation detecting sensor for detecting a relative rotation between the outer and inner members;
    at least one status detecting sensor for detecting a status of the bearing assembly other than the relative rotation that is detected by the rotation detecting sensor;
    a transmitting device for transmitting wireless respective sensor outputs generated by the rotation detecting sensor and the status detecting sensor;
    a first digitalizing device for digitalizing the sensor output from the rotation detecting sensor and a second digitalizing device for digitalizing the sensor output from the at least one status detecting sensor; and
    a signal coordinating device for coordinating the respective sensor outputs from the rotation detecting sensor and the at least one status detecting sensor, which have been digitalized by the first and second digitalizing device, respectively, to enable those sensor outputs to be transmitted wireless by the transmitting device.

2. The vehicle mounted bearing assembly as claimed in claim 1, wherein the vehicle mounted bearing assembly is a wheel support bearing assembly including the outer member having the inner peripheral surface formed with the at least two axially spaced apart raceways, the inner member positioned inside the outer member and having the raceways defined therein in cooperative relation with and in alignment with the raceways in the outer member, and rows of the rolling elements positioned within the annular space, delimited between the inner and outer members, and accommodated in part within the raceways in the outer member and in part within the raceways in the inner member, and operable to rotatably support the vehicle wheel relative to the vehicle body structure.

3. The vehicle mounted bearing assembly as claimed in claim 1, wherein the status detecting sensor is one or both of temperature and vibration detecting sensors.

4. The vehicle mounted bearing assembly as claimed in claim 1, wherein the signal coordinating device is a data switching device for sequentially switching one of output signals from the first and second digitalizing device such that the signal coordinating device receives the output signals one at a time.

5. The vehicle mounted bearing assembly as claimed in claim 1, wherein the first digitalizing device is operable to convert or encode the sensor output of the rotation detecting sensor, which has been digitalized thereby, into a digital data of a predetermined data format and then to output the digital data.

6. The vehicle mounted bearing assembly as claimed in claim 1, wherein the rotation detecting sensor is a device for generating a train of pulses and the sensor output of the rotation detecting sensor which has been digitalized by the first digitalizing device is a cycle data of the train of the pulses.

7. The vehicle mounted bearing assembly as claimed in claim 1, wherein the transmitting device is of a type capable of implementing spread spectrum communication.

8. The vehicle mounted bearing assembly as claimed in claim 1, wherein the rotation detecting sensor comprises an electric power generator.

9. The vehicle mounted bearing assembly as claimed in claim 1, wherein the transmitting device is of a type utilizable as a mobile terminal connectable to a mobile communication network.

10. A vehicle mounted bearing assembly, operable to rotatably support a vehicle wheel relative to a vehicle body structure, which comprises:
    an outer member having an inner peripheral surface formed with at least two axially spaced apart raceways;
    an inner member positioned inside the outer member and having raceways defined therein in cooperative relation with and in alignment with the raceways in the outer member;
    rows of rolling elements positioned within an annular space, delimited between the inner and outer members, and accommodated in part within the raceways in the outer member and in part within the raceways in the inner member;
    a rotation detecting sensor for detecting a relative rotation between the outer and inner members;
    at least one status detecting sensor for detecting a status of the bearing assembly other than the relative rotation that is detected by the rotation detecting sensor;
    a transmitting device for transmitting wireless respective sensor outputs generated by the rotation detecting sensor and the status detecting sensor;
    a first digitalizing device digitalizing the sensor output from the rotation detecting sensor; and
    a second digitalizing device digitalizing the sensor output from the at least one status detecting sensor,
    wherein the first digitalizing device generates a signal, representative of bits of the sensor output of the rotation detecting sensor, added with at least one redundant bit.

* * * * *